United States Patent
Harbers et al.

(10) Patent No.: US 9,425,896 B2
(45) Date of Patent: Aug. 23, 2016

(54) COLOR MODULATED LED-BASED ILLUMINATION

(71) Applicant: Xicato, Inc., San Jose, CA (US)

(72) Inventors: Gerard Harbers, Sunnyvale, CA (US); Barry Mark Loveridge, San Jose, CA (US)

(73) Assignee: Xicato, Inc., San Jose, CA (US)

( * ) Notice: Subject to any disclaimer, the term of this patent is extended or adjusted under 35 U.S.C. 154(b) by 0 days.

(21) Appl. No.: 14/578,240

(22) Filed: Dec. 19, 2014

(65) Prior Publication Data

US 2015/0188631 A1 Jul. 2, 2015

Related U.S. Application Data

(60) Provisional application No. 61/922,608, filed on Dec. 31, 2013.

(51) Int. Cl.
*H04B 10/116* (2013.01)
*H05B 33/08* (2006.01)
*H05B 37/02* (2006.01)

(52) U.S. Cl.
CPC .......... *H04B 10/116* (2013.01); *H05B 33/0803* (2013.01); *H05B 33/0818* (2013.01); *H05B 33/0857* (2013.01); *H05B 33/0869* (2013.01); *H05B 37/0272* (2013.01)

(58) Field of Classification Search
CPC ............. H04B 10/116; H05B 33/0818; H05B 33/0857; H05B 33/0869; H05B 33/0803; H05B 37/0272
USPC .................................................. 398/116, 172
See application file for complete search history.

(56) References Cited

U.S. PATENT DOCUMENTS

| | | |
|---|---|---|
| 5,959,316 A | 9/1999 | Lowery |
| 6,351,069 B1 | 2/2002 | Lowery et al. |
| 6,504,301 B1 | 1/2003 | Lowery |
| 6,586,882 B1 | 7/2003 | Harbers |
| 6,600,175 B1 | 7/2003 | Baretz et al. |
| 6,680,569 B2 | 1/2004 | Mueller-Mach et al. |
| 6,812,500 B2 | 11/2004 | Reeh et al. |

(Continued)

FOREIGN PATENT DOCUMENTS

| | | | |
|---|---|---|---|
| NL | WO 2009136312 A1 * | 11/2009 | ............. H05B 37/02 |
| WO | WO 2009/136312 A1 | 11/2009 | |
| WO | WO 2014/060895 A1 | 4/2014 | |

OTHER PUBLICATIONS

International Search Report and Written Opinion mailed on Apr. 10, 2014 for International Application No. PCT/US2014/072599 filed on Dec. 29, 2014 by Xicato, Inc., 13 pages.

*Primary Examiner* — Dalzid Singh
(74) *Attorney, Agent, or Firm* — Silicon Valley Patent Group LLP

(57) ABSTRACT

An LED based illumination device transmits information by receiving an amount of digital data and modulating a color of light emitted from the LED based illumination device based on the digital data. The luminous flux of the emitted light remains approximately constant while the color of light varies. A receiver may receive the emitted light and demodulate a signal indicative of the color of emitted light to determine the digital data. The color of the light may be modulated by varying current provided to different LEDs, where the different LEDs cause different color of light to be emitted from the LED based illumination device.

22 Claims, 16 Drawing Sheets

(56) References Cited

U.S. PATENT DOCUMENTS

| | | |
|---|---|---|
| 7,126,162 B2 | 10/2006 | Reeh et al. |
| 7,250,715 B2 | 7/2007 | Mueller et al. |
| 7,479,662 B2 | 1/2009 | Soules et al. |
| 7,564,180 B2 | 7/2009 | Brandes |
| 7,614,759 B2 | 11/2009 | Negley |
| 7,629,621 B2 | 12/2009 | Reeh et al. |
| 2007/0081336 A1 | 4/2007 | Bierhuizen et al. |
| 2012/0038280 A1* | 2/2012 | Zoorob ............ F21K 9/00 315/151 |
| 2012/0287624 A1 | 11/2012 | Harbers |
| 2013/0028612 A1* | 1/2013 | Ryan ............ G01S 1/70 398/172 |
| 2014/0270793 A1* | 9/2014 | Bradford ............ H04B 10/116 398/118 |
| 2014/0321115 A1* | 10/2014 | Goldstein ............ F21S 10/02 362/231 |
| 2015/0173151 A1* | 6/2015 | Ter Weeme ........ H05B 33/0863 315/294 |

\* cited by examiner

COLOR MODULATED LED-BASED ILLUMINATION

CROSS REFERENCE TO RELATED APPLICATIONS

This application claims priority under 35 USC 119 to U.S. Provisional Application No. 61/922,608, filed Dec. 31, 2013, which is incorporated by reference herein in its entirety.

TECHNICAL FIELD

The described embodiments relate to illumination modules that include Light Emitting Diodes (LEDs).

BACKGROUND

The use of light emitting diodes in general lighting is still limited due to limitations in light output level or flux generated by the illumination devices. Illumination devices that use LEDs also typically suffer from poor color quality characterized by color point instability. The color point instability varies over time as well as from part to part. Poor color quality is also characterized by poor color rendering, which is due to the spectrum produced by the LED light sources having bands with no or little power. Further, illumination devices that use LEDs typically have spatial and/or angular variations in the color. Additionally, illumination devices that use LEDs are expensive due to, among other things, the necessity of required color control electronics and/or sensors to maintain the color point of the light source or using only a small selection of produced LEDs that meet the color and/or flux requirements for the application.

Consequently, improvements to illumination device that uses light emitting diodes as the light source are desired.

SUMMARY

An LED based illumination device transmits information by receiving an amount of digital data and modulating a color of light emitted from the LED based illumination device based on the digital data. The luminous flux of the emitted light remains approximately constant while the color of light varies. A receiver may receive the emitted light and demodulate a signal indicative of the color of emitted light to determine the digital data. The color of the light may be modulated by varying current provided to different LEDs, where the different LEDs cause different color of light to be emitted from the LED based illumination device.

In one implementation, a method of transmitting information from an LED based illumination device includes receiving an amount of digital data; and modulating a color of light emitted from the LED based illumination device based on the digital data such that a luminous flux of the light emitted from the LED based illumination device remains approximately constant while the color of light varies.

In one implementation, a method of receiving information from an LED based illumination device includes receiving an amount of light emitted from the LED based illumination device, wherein a luminous flux of the amount of light emitted from the LED based illumination device remains approximately constant while a color of light varies; determining a signal indicative of the color of the received light; and demodulating the signal indicative of the color of the received light to determine the digital data received from the LED based illumination device.

In one implementation, an LED based illumination device includes a first LED configured to receive a first current, wherein light emitted from the first LED enters a color conversion cavity, and wherein a first light emitted from the LED based illumination device based on the light emitted from the first LED is a first colored light; a second LED configured to receive a second current, wherein light emitted from the second LED enters the color conversion cavity, and wherein a second light emitted from the LED based illumination device based on the light emitted from the second LED is a second colored light; and a modulator configured to receive an amount of digital data and modulate the first current and the second current such that a luminous flux of the light emitted from the LED based illumination device remains approximately constant and a combined color of light emitted from the LED based illumination device varies based on the digital data.

BRIEF DESCRIPTION OF THE DRAWINGS

The accompanying drawings, where like numerals indicate like components, illustrate embodiments of the invention.

DETAILED DESCRIPTION

Reference will now be made in detail to background examples and some embodiments of the invention, examples of which are illustrated in the accompanying drawings.

Figure 1:
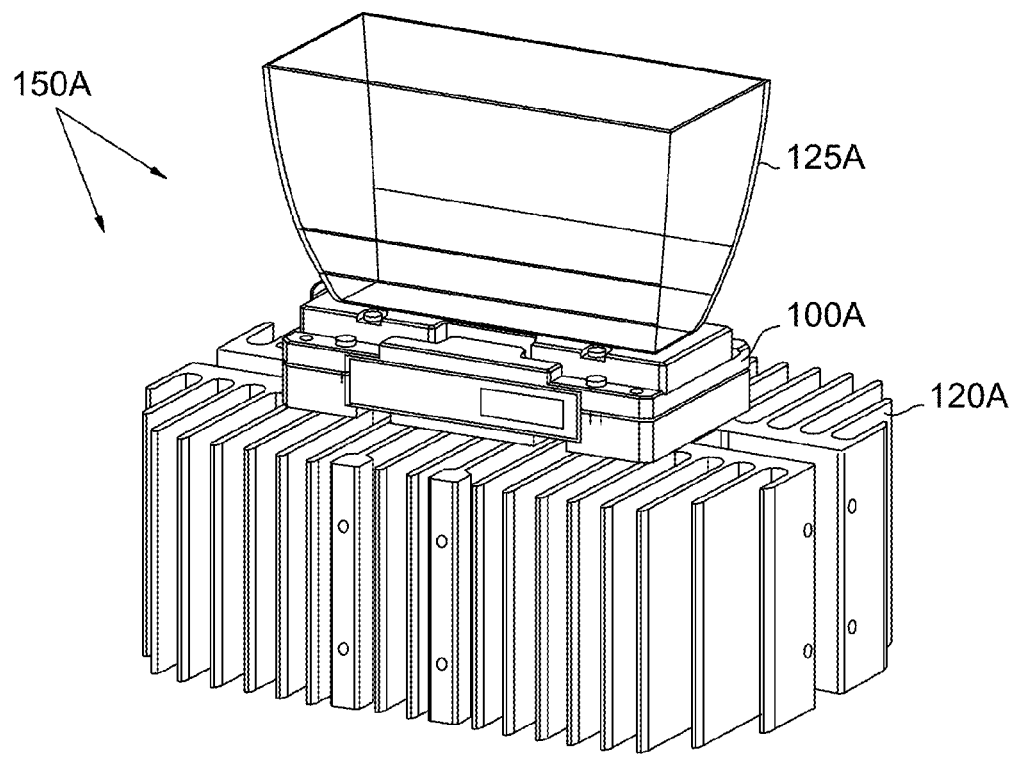
FIGS. 1, 2, and 3 illustrate exemplary luminaires, including an illumination device, reflector, and light fixture.
Figure 2:
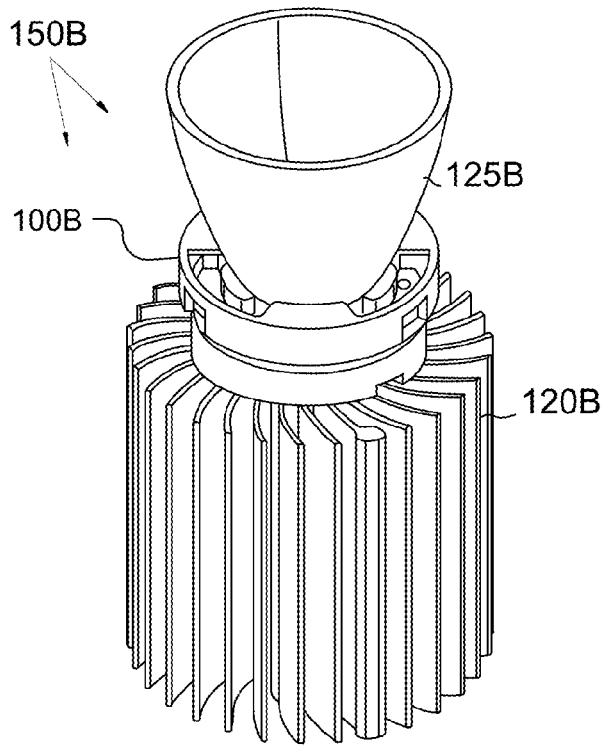
Figure 3:
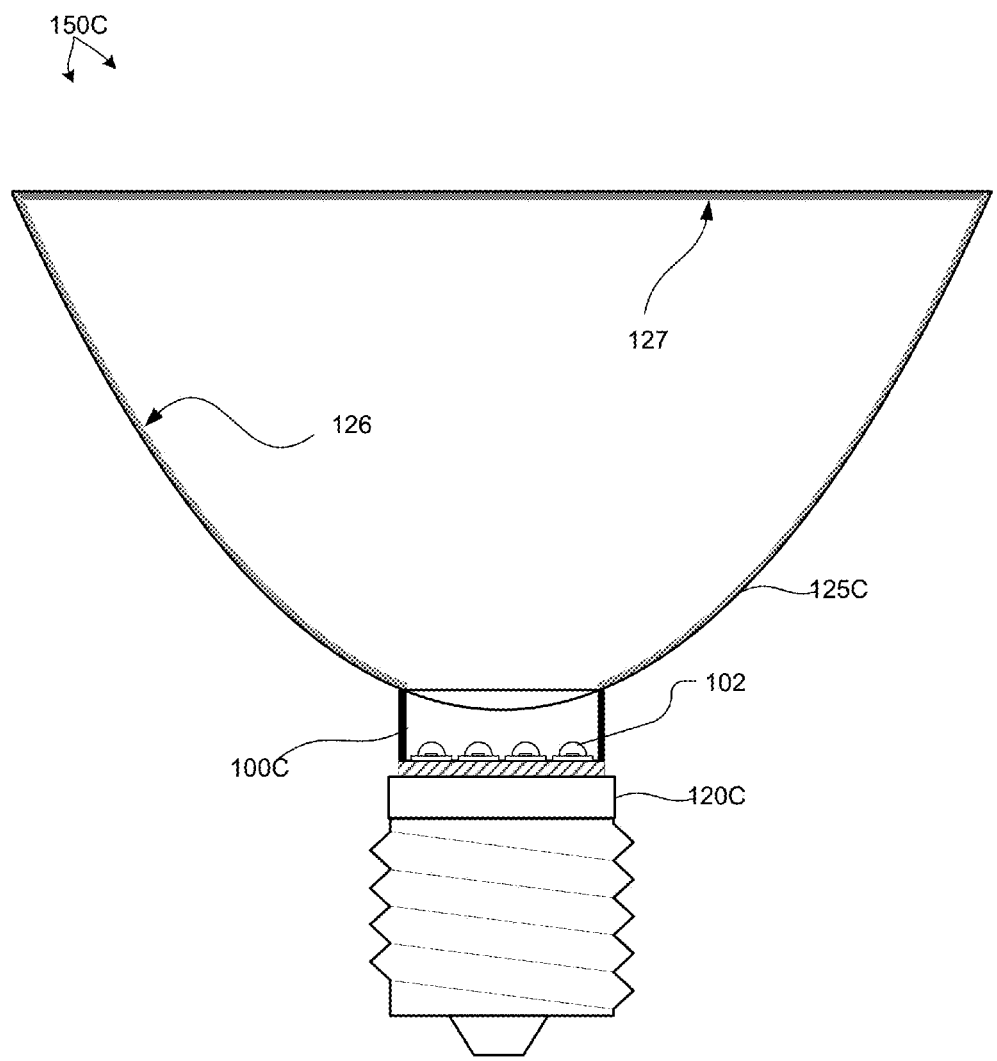

FIGS. 1, 2, and 3 illustrate three exemplary luminaires, respectively all labeled 150A, 150B, and 150C (sometimes collectively or generally refered to as luminaire 150). The luminaire 150A illustrated in FIG. 1 includes an illumination device 100A with a rectangular form factor. The luminaire 150B illustrated in FIG. 2 includes an illumination device 100B with a circular form factor. The luminaire 150C illustrated in FIG. 3 includes an illumination device 100C integrated into a retrofit lamp device. These examples are for illustrative purposes. Examples of illumination modules of general polygonal and elliptical shapes may also be contemplated. Luminaire 150 includes illumination device 100, reflector 125, and light fixture 120. FIG. 1 illustrates luminaire 150A with an LED based illumination device 100A, reflector 125A, and light fixture 120A. FIG. 2 illustrates luminaire 150B with an LED based illumination device 100B, reflector 125B, and light fixture 120B. FIG. 3 illustrates luminaire 150C with an LED based illumination device 100C, reflector 125C, and light fixture 120C. For the sake of simplicity, LED based illumination modules 100A, 100B, and 100C may be collectively referred to as illumination device 100, reflectors 1250A, 125B, and 125C may be collectively referred to as reflector 125, and light fixtures 120A, 120B, and 120C may be collectively referred to as light fixture 120. As illustrated in FIG. 3, the LED based illumination device 100 includes LEDs 102. As depicted, light fixture 120 includes a heat sink capability, and therefore may be sometimes referred to as heat sink 120. However, light fixture 120 may include other structural and decorative elements (not shown). Reflector 125 is mounted to illumination device 100 to collimate or deflect light emitted from illumination device 100. The reflector 125 may be made from a thermally conductive material, such as a material that includes aluminum or copper and may be thermally coupled to illumination device 100. Heat flows by conduction through illumination device 100 and the thermally conductive reflector 125. Heat also flows via thermal convection over the reflector 125. Reflector 125 may be a compound parabolic concentrator, where the concentrator is constructed of or coated with a highly reflecting material. Optical elements, such as a diffuser or reflector 125 may be removably coupled to illumination device 100, e.g., by means of threads, a clamp, a twist-lock mechanism, or other appropriate arrangement. As illustrated in FIG. 3, the reflector 125 may include sidewalls 126 and a window 127 that are optionally coated, e.g., with a wavelength converting material, diffusing material or any other desired material.

As depicted in FIGS. 1, 2, and 3, illumination device 100 is mounted to heat sink 120. Heat sink 120 may be made from a thermally conductive material, such as a material that includes aluminum or copper and may be thermally coupled to illumination device 100. Heat flows by conduction through illumination device 100 and the thermally conductive heat sink 120. Heat also flows via thermal convection over heat sink 120. Illumination device 100 may be attached to heat sink 120 by way of screw threads to clamp the illumination device 100 to the heat sink 120. To facilitate easy removal and replacement of illumination device 100, illumination device 100 may be removably coupled to heat sink 120, e.g., by means of a clamp mechanism, a twist-lock mechanism, or other appropriate arrangement. Illumination device 100 includes at least one thermally conductive surface that is thermally coupled to heat sink 120, e.g., directly or using thermal grease, thermal tape, thermal pads, or thermal epoxy. For adequate cooling of the LEDs, a thermal contact area of at least 50 square millimeters, but preferably 100 square millimeters should be used per one watt of electrical energy flow into the LEDs on the board. For example, in the case when 20 LEDs are used, a 1000 to 2000 square millimeter heatsink contact area should be used. Using a larger heat sink 120 may permit the LEDs 102 to be driven at higher power, and also allows for different heat sink designs. For example, some designs may exhibit a cooling capacity that is less dependent on the orientation of the heat sink. In addition, fans or other solutions for forced cooling may be used to remove the heat from the device. The bottom heat sink may include an aperture so that electrical connections can be made to the illumination device 100.

Figure 4:
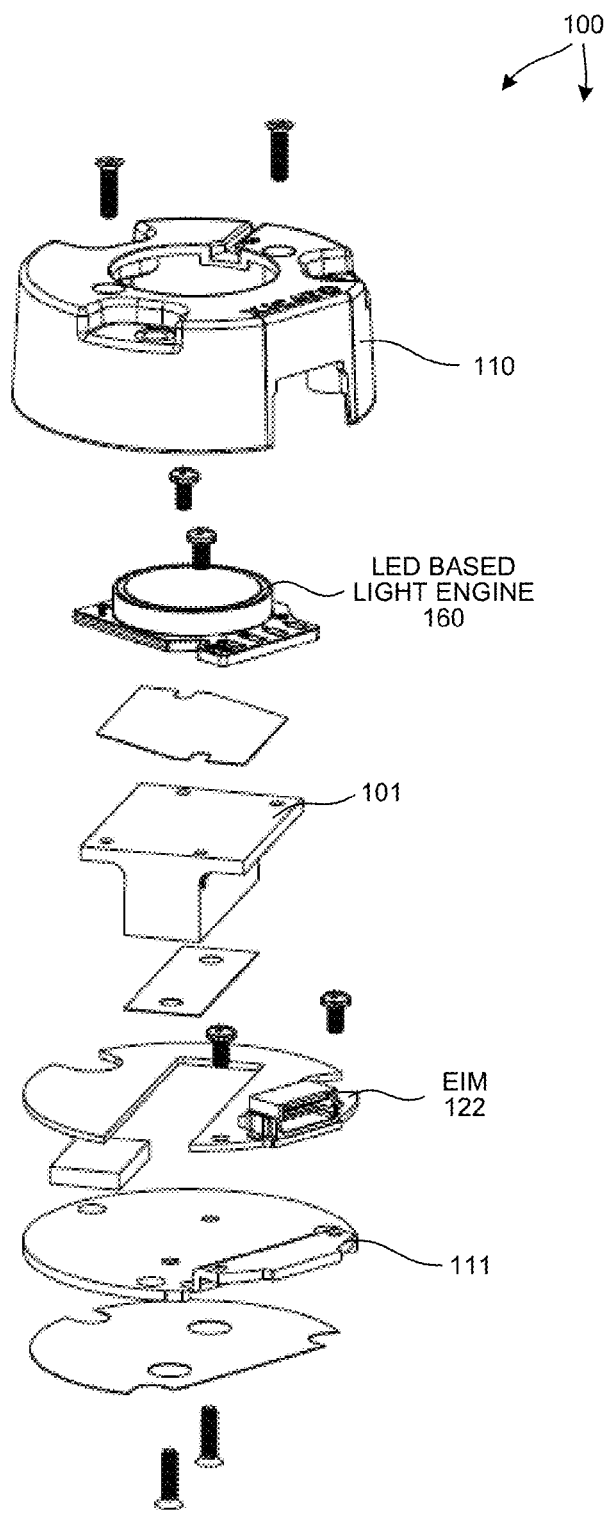
FIG. 4 shows an exploded view illustrating components of LED based illumination device as depicted in FIG. 2.

FIG. 4 shows an exploded view illustrating components of LED based illumination device 100 as depicted in FIG. 2. It should be understood that as defined herein an LED based illumination device is not an LED, but is an LED light source or fixture or component part of an LED light source or fixture. LED based illumination device 100 includes an LED based light engine 160 configured to generate an amount of light. LED based light engine 160 is coupled to a mounting base 101 to promote heat extraction from LED based light engine 160. Optionally, an electronic interface module (EIM) 122 is shaped to fit around mounting base 101. LED based light engine 160 and mounting base 101 are enclosed between a lower mounting plate 111 and an upper housing 110. An optional reflector retainer (not shown) is coupled to upper housing 110. The reflector retainer is configured to facilitate attachment of different reflectors to the LED based illumination device 100.

Figure 5:
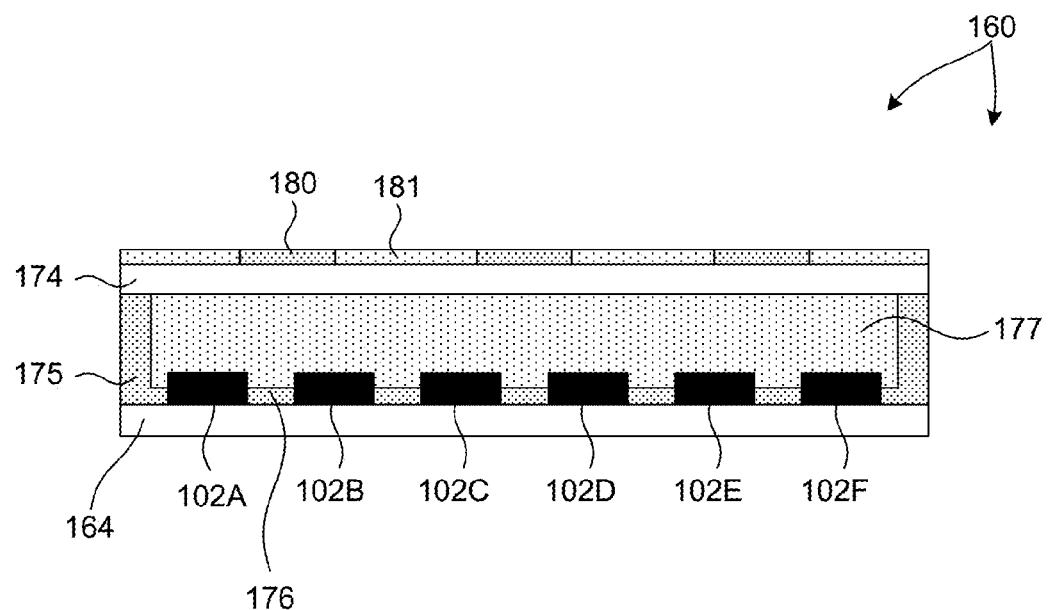
FIG. 5 is illustrative of an LED based light engine that may be used in the LED based illumination device.

FIG. 5 is illustrative of LED based light engine 160 in one embodiment. LED based light engine 160 includes one or more LED die or packaged LEDs and a mounting board to which LED die or packaged LEDs are attached. In addition, LED based light engine 160 includes one or more transmissive elements (e.g., windows or sidewalls) coated or impregnated with one or more wavelength converting materials to achieve light emission at a desired color point.

As illustrated in FIG. 5, LED based light engine 160 includes a number of LEDs 102A-F (collectively referred to as LEDs 102) mounted to mounting board 164 in a chip on board (COB) configuration. The spaces between each LED are filled with a reflective material 176 (e.g., a white silicone material). In addition, a dam of reflective material 175 surrounds the LEDs 102 and supports transmissive element 174, sometimes referred to as transmissive plate 174. The space between LEDs 102 and transmissive plate 174 is filled with an encapsulating material 177 (e.g., silicone) to promote light extraction from LEDs 102 and to separate LEDs 102 from the environment. In the depicted embodiment, the dam of reflective material 175 is both the thermally conductive structure that conducts heat from transmissive plate 174 to LED mounting board 164 and the optically reflective structure that reflects incident light from LEDs 102 toward transmissive plate 174.

LEDs 102 can emit different or the same color light, either by direct emission or by phosphor conversion, e.g., where phosphor layers are applied to the LEDs as part of the LED package. The illumination device 100 may use any combination of colored LEDs 102, such as red, green, blue, ultraviolet, amber, or cyan, or the LEDs 102 may all produce the same color light. Some or all of the LEDs 102 may produce white light. In addition, the LEDs 102 may emit polarized light or non-polarized light and LED based illumination device 100 may use any combination of polarized or non-polarized LEDs. In some embodiments, LEDs 102 emit either blue or UV light because of the efficiency of LEDs emitting in these wavelength ranges. The light emitted from the illumination device 100 has a desired color when LEDs 102 are used in combination with wavelength converting materials on transmissive plate 174, for example. By tuning the chemical and/or physical (such as thickness and concentration) properties of the wavelength converting materials and the geometric properties of the coatings on the surface of transmissive plate 174, specific color properties of light output by LED based illumination device 100 may be specified, e.g., color point, color temperature, and color rendering index (CRI).

For purposes of this patent document, a wavelength converting material is any single chemical compound or mixture of different chemical compounds that performs a color conversion function, e.g., absorbs an amount of light of one peak wavelength, and in response, emits an amount of light at another peak wavelength.

By way of example, phosphors may be chosen from the set denoted by the following chemical formulas: Y3Al5O12:Ce, (also known as YAG:Ce, or simply YAG) (Y,Gd)3Al5O12:Ce, CaS:Eu, SrS:Eu, SrGa2S4:Eu, Ca3(Sc,Mg)2Si3O12:Ce, Ca3Sc2Si3O12:Ce, Ca3Sc2O4:Ce, Ba3Si6O12N2:Eu, (Sr, Ca)AlSiN3:Eu, CaAlSiN3:Eu, CaAlSi(ON)3:Eu, Ba2SiO4: Eu, Sr2SiO4:Eu, Ca2SiO4:Eu, CaSc2O4:Ce, CaSi2O2N2: Eu, SrSi2O2N2:Eu, BaSi2O2N2:Eu, Ca5(PO4)3Cl:Eu, Ba5 (PO4)3Cl:Eu, Cs2CaP2O7, Cs2SrP2O7, Lu3Al5O12:Ce, Ca8Mg(SiO4)4Cl2:Eu, Sr8Mg(SiO4)4Cl2:Eu, La3Si6N11: Ce, Y3Ga5O12:Ce, Gd3Ga5O12:Ce, Tb3Al5O12:Ce, Tb3Ga5O12:Ce, and Lu3Ga5O12:Ce.

In one example, the adjustment of color point of the illumination device may be accomplished by adding or removing wavelength converting material from transmissive plate 174. In one embodiment a red emitting phosphor 181 such as an alkaline earth oxy silicon nitride covers a portion of transmissive plate 174, and a yellow emitting phosphor 180 such as a YAG phosphor covers another portion of transmissive plate 174.

In some embodiments, the phosphors are mixed in a suitable solvent medium with a binder and, optionally, a surfactant and a plasticizer. The resulting mixture is deposited by any of spraying, screen printing, blade coating, jetting, or other suitable means. By choosing the shape and height of the transmissive plate 174, and selecting which portions of transmissive plate 174 will be covered with a particular phosphor or not, and by optimization of the layer thickness and concentration of a phosphor layer on the surfaces, the color point of the light emitted from the device can be tuned as desired.

In one example, a single type of wavelength converting material may be patterned on a portion of transmissive plate 174. By way of example, a red emitting phosphor 181 may be patterned on different areas of the transmissive plate 174 and a yellow emitting phosphor 180 may be patterned on other areas of transmissive plate 174. In some examples, the areas may be physically separated from one another. In some other examples, the areas may be adjacent to one another. The coverage and/or concentrations of the phosphors may be varied to produce different color temperatures. It should be understood that the coverage area of the red and/or the concentrations of the red and yellow phosphors will need to vary to produce the desired color temperatures if the light produced by the LEDs 102 varies. The color performance of the LEDs 102, red phosphor and the yellow phosphor may be measured and modified by any of adding or removing phosphor material based on performance so that the final assembled product produces the desired color temperature.

Transmissive plate 174 may be constructed from a suitable optically transmissive material (e.g., sapphire, quartz, alumina, crown glass, polycarbonate, and other plastics). Transmissive plate 174 is spaced above the light emitting surface of LEDs 102 by a clearance distance. In some embodiments, this is desirable to allow clearance for wire bond connections from the LED package submount to the active area of the LED. In some embodiments, a clearance of one millimeter or less is desirable to allow clearance for wire bond connections. In some other embodiments, a clearance of two hundred microns or less is desirable to enhance light extraction from the LEDs 102.

In some other embodiments, the clearance distance may be determined by the size of the LED 102. For example, the size of the LED 102 may be characterized by the length dimension of any side of a single, square shaped active die area. In some other examples, the size of the LED 102 may be characterized by the length dimension of any side of a rectangular shaped active die area. Some LEDs 102 include many active die areas (e.g., LED arrays). In these examples, the size of the LED 102 may be characterized by either the size of any individual die or by the size of the entire array. In some embodiments, the clearance should be less than the size of the LED 102. In some embodiments, the clearance should be less than twenty percent of the size of the LED 102. In some embodiments, the clearance should be less than five percent of the size of the LED. As the clearance is reduced, light extraction efficiency may be improved, but output beam uniformity may also degrade.

In some other embodiments, it is desirable to attach transmissive plate 174 directly to the surface of the LED 102. In this manner, the direct thermal contact between transmissive plate 174 and LEDs 102 promotes heat dissipation from LEDs 102. In some other embodiments, the space between mounting board 164 and transmissive plate 174 may be filled with a solid encapsulate material. By way of example, silicone may be used to fill the space. In some other embodiments, the space may be filled with a fluid to promote heat extraction from LEDs 102.

In the embodiment illustrated in FIG. 5, the surface of patterned transmissive plate 174 facing LEDs 102 is coupled to LEDs 102 by an amount of flexible, optically translucent encapsulating material 177. By way of non-limiting example, the flexible, optically translucent encapsulating material 177 may include an adhesive, an optically clear silicone, a silicone loaded with reflective particles (e.g., titanium dioxide (TiO2), zinc oxide (ZnO), and barium sulfate (BaSO4) particles, or a combination of these materials), a silicone loaded with a wavelength converting material (e.g., phosphor particles), a sintered PTFE material, etc. Such material may be applied to couple transmissive plate 174 to LEDs 102 in any of the embodiments described herein.

In some embodiments, multiple, stacked transmissive layers or plates are employed. Each transmissive plate includes different wavelength converting materials. For example, a transmissive plate including a wavelength converting material may be placed over another transmissive plate including a different wavelength converting material. In this manner, the color point of light emitted from LED based illumination device 100 may be tuned by replacing the different transmissive plates independently to achieve a desired color point. In some embodiments, the different transmissive plates may be placed in contact with each other to promote light extraction. In some other embodiments, the different transmissive plates may be separated by a distance to promote cooling of the transmissive layers. For example, airflow may by introduced through the space to cool the transmissive layers.

The mounting board 164 provides electrical connections to the attached LEDs 102 to a power supply (not shown). In one embodiment, the LEDs 102 are packaged LEDs, such as the Luxeon Rebel manufactured by Philips Lumileds Lighting. Other types of packaged LEDs may also be used, such as those manufactured by OSRAM (Ostar package), Luminus Devices (USA), Cree (USA), Nichia (Japan), or Tridonic (Austria). As defined herein, a packaged LED is an assembly of one or more LED die that contains electrical connections, such as wire bond connections or stud bumps, and possibly includes an optical element and thermal, mechanical, and electrical interfaces. The LEDs 102 may include a lens over the LED chips. Alternatively, LEDs without a lens may be used. LEDs without lenses may include protective layers, which may include phosphors. The phosphors can be applied as a dispersion in a binder, or applied as a separate plate. Each LED 102 includes at least one LED chip or die, which may be mounted on a submount. The LED chip typically has a size about 1 mm by 1 mm by 0.5 mm, but these dimensions may vary. In some embodiments, the LEDs 102 may include multiple chips. The multiple chips can emit light of similar or different colors, e.g., red, green, and blue. The LEDs 102 may emit polarized light or non-polarized light and LED based illumination device 100 may use any combination of polarized or non-polarized LEDs. In some embodiments, LEDs 102 emit either blue or UV light because of the efficiency of LEDs emitting in these wavelength ranges. In addition, different phosphor layers may be applied on different chips on the same submount. The submount may be ceramic or other appropriate material. The submount typically includes electrical contact pads on a bottom surface that are coupled to contacts on the mounting board 164. Alternatively, electrical bond wires may be used to electrically connect the chips to a mounting board. Along with electrical contact pads, the LEDs 102 may include thermal contact areas on the bottom surface of the submount through which heat generated by the LED chips can be extracted. The thermal contact areas are coupled to heat spreading layers on the mounting board 164. Heat spreading layers may be disposed on any of the top, bottom, or intermediate layers of mounting board 164. Heat spreading layers may be connected by vias that connect any of the top, bottom, and intermediate heat spreading layers.

In some embodiments, the mounting board 164 conducts heat generated by the LEDs 102 to the sides of the mounting board 164 and the bottom of the mounting board 164. In one example, the bottom of mounting board 164 may be thermally coupled to a heat sink 120 (shown in FIGS. 1-3) via mounting base 101. In other examples, mounting board 164 may be directly coupled to a heat sink, or a lighting fixture and/or other mechanisms to dissipate the heat, such as a fan. In some embodiments, the mounting board 164 conducts heat to a heat sink thermally coupled to the top of the mounting board 164. Mounting board 164 may be an FR4 board, e.g., that is 0.5 mm thick, with relatively thick copper layers, e.g., 30 µm to 100 µm, on the top and bottom surfaces that serve as thermal contact areas. In other examples, the mounting board 164 may be a metal core printed circuit board (PCB) or a ceramic submount with appropriate electrical connections. Other types of boards may be used, such as those made of alumina (aluminum oxide in ceramic form), or aluminum nitride (also in ceramic form).

Mounting board 164 includes electrical pads to which the electrical pads on the LEDs 102 are connected. The electrical pads are electrically connected by a metal, e.g., copper, trace to a contact, to which a wire, bridge or other external electrical source is connected. In some embodiments, the electrical pads may be vias through the mounting board 164 and the electrical connection is made on the opposite side, i.e., the bottom, of the board. Mounting board 164, as illustrated, is rectangular in dimension. LEDs 102 mounted to mounting board 164 may be arranged in different configurations on rectangular mounting board 164. In one example LEDs 102 are aligned in rows extending in the length dimension and in columns extending in the width dimension of mounting board 164. In another example, LEDs 102 are arranged in a hexagonally closely packed structure. In such an arrangement each LED is equidistant from each of its immediate neighbors. Such an arrangement is desirable to increase the uniformity and efficiency of emitted light.

Figure 6:
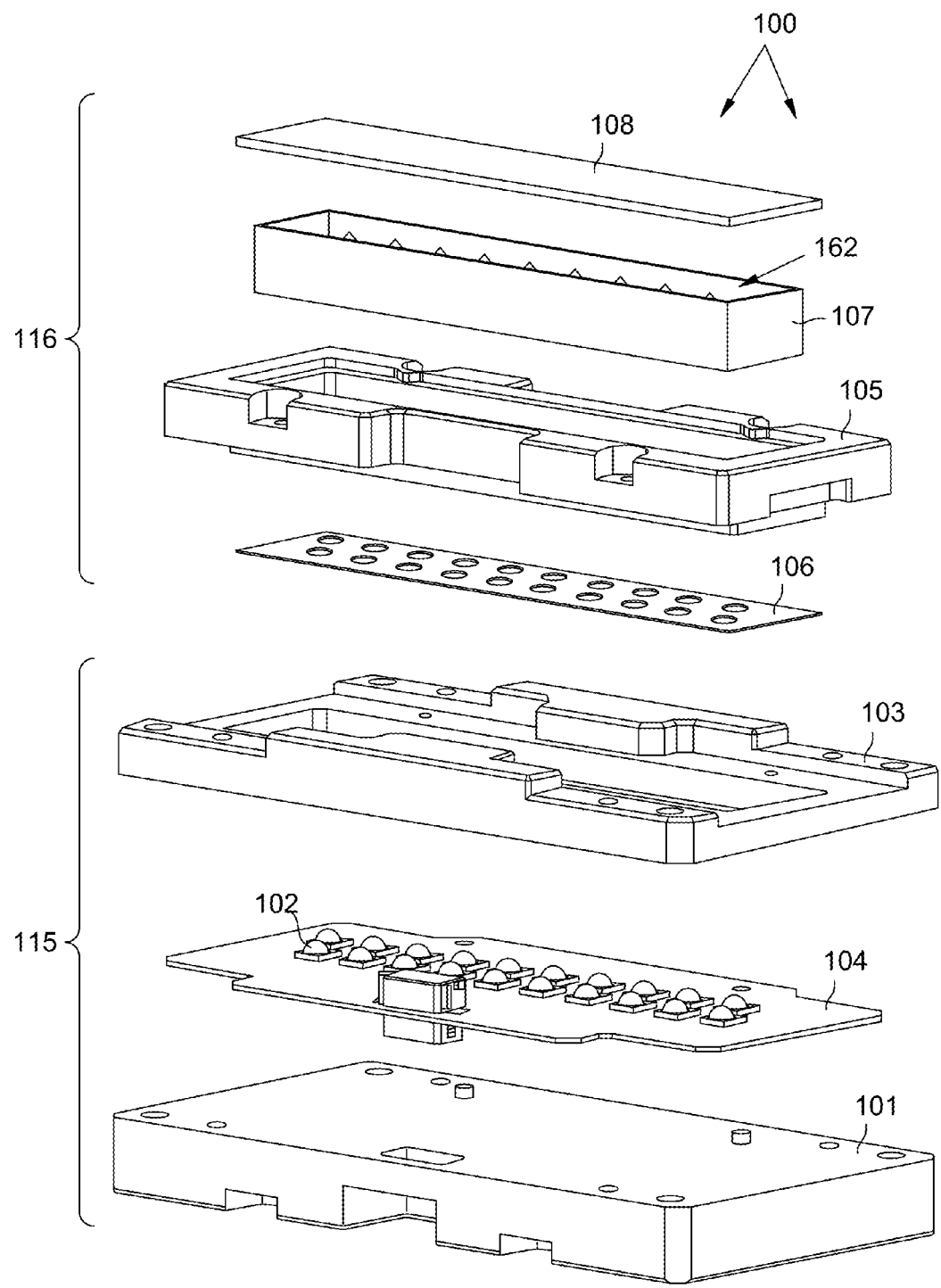
FIG. 6 illustrates an exploded view of components of LED based illumination device in another embodiment.

FIG. 6 illustrates an exploded view of components of LED based illumination device 100 in another embodiment. LED based illumination device 100 includes one or more LED die or packaged LEDs and a mounting board to which LED die or packaged LEDs are attached. In one embodiment, the LEDs 102 are packaged LEDs, such as the Luxeon Rebel manufactured by Philips Lumileds Lighting. Other types of packaged LEDs may also be used, such as those manufactured by OSRAM (Oslon package), Luminus Devices (USA), Cree (USA), Nichia (Japan), or Tridonic (Austria). Mounting board 104 is attached to mounting base 101 and secured in position by mounting board retaining ring 103. Together, mounting board 104 populated by LEDs 102 and mounting board retaining ring 103 comprise light source sub-assembly 115. Light source sub-assembly 115 is operable to convert electrical energy into light using LEDs 102. The light emitted from light source sub-assembly 115 is directed to light conversion sub-assembly 116 for color mixing and color conversion. Light conversion sub-assembly 116 includes cavity body 105 and an output port, which is illustrated as, but is not limited to, an output window 108. Light conversion sub-assembly 116 may include a bottom reflector 106 and sidewall 107, which may optionally be formed from inserts. Output window 108, if used as the output port, is fixed to the top of cavity body 105. In some embodiments, output window 108 may be fixed to cavity body 105 by an adhesive. To promote heat dissipation from the output window to cavity body 105, a thermally conductive adhesive is desirable. The adhesive should reliably withstand the temperature present at the interface of the output window 108 and cavity body 105. Furthermore, it is preferable that the adhesive either reflect or transmit as much incident light as possible, rather than absorbing light emitted from output window 108. In one example, the combination of heat tolerance, thermal conductivity, and optical properties of one of several adhesives manufactured by Dow Corning (USA) (e.g., Dow Corning model number SE4420, SE4422, SE4486, 1-4173, or SE9210), provides suitable performance. However, other thermally conductive adhesives may also be considered.

Either the interior sidewalls of cavity body 105 or sidewall insert 107, when optionally placed inside cavity body 105, is reflective so that light from LEDs 102, as well as any wavelength converted light, is reflected within the cavity 162 until it is transmitted through the output port, e.g., output window 108 when mounted over light source sub-assembly 115. Bottom reflector insert 106 may optionally be placed over mounting board 104. Bottom reflector insert 106 includes holes such that the light emitting portion of each LED 102 is not blocked by bottom reflector insert 106. Sidewall insert 107 may optionally be placed inside cavity body 105 such that the interior surfaces of sidewall insert 107 direct light from the LEDs 102 to the output window when cavity body 105 is mounted over light source sub-assembly 115. Although as depicted, the interior sidewalls of cavity body 105 are rectangular in shape as viewed from the top of illumination device 100, other shapes may be contemplated (e.g., clover shaped or polygonal). In addition, the interior sidewalls of cavity body 105 may taper or curve outward from mounting board 104 to output window 108, rather than perpendicular to output window 108 as depicted.

Bottom reflector insert 106 and sidewall insert 107 may be highly reflective so that light reflecting downward in the cavity 162 is reflected back generally towards the output port, e.g., output window 108. Additionally, inserts 106 and 107 may have a high thermal conductivity, such that it acts as an additional heat spreader. By way of example, the inserts 106 and 107 may be made with a highly thermally conductive material, such as an aluminum based material that is processed to make the material highly reflective and durable. By way of example, a material referred to as Miro®, manufactured by Alanod, a German company, may be used. High reflectivity may be achieved by polishing the aluminum, or by covering the inside surface of inserts 106 and 107 with one or more reflective coatings. Inserts 106 and 107 might alternatively be made from a highly reflective thin material, such as Vikuiti™ ESR, as sold by 3M (USA), Lumirror™ E60L manufactured by Toray (Japan), or microcrystalline polyethylene terephthalate (MCPET) such as that manufactured by Furukawa Electric Co. Ltd. (Japan). In other examples, inserts 106 and 107 may be made from a polytetrafluoroethylene PTFE material. In some examples inserts 106 and 107 may be made from a PTFE material of one to two millimeters thick, as sold by W.L. Gore (USA) and Berghof (Germany). In yet other embodiments, inserts 106 and 107 may be constructed from a PTFE material backed by a thin reflective layer such as a metallic layer or a non-metallic layer such as ESR, E60L, or MCPET. Also, highly diffuse reflective coatings can be applied to any of sidewall insert 107, bottom reflector insert 106, output window 108, cavity body 105, and mounting board 104. Such coatings may include titanium dioxide (TiO2), zinc oxide (ZnO), and barium sulfate (BaSO4) particles, or a combination of these materials.

Figure 7A:
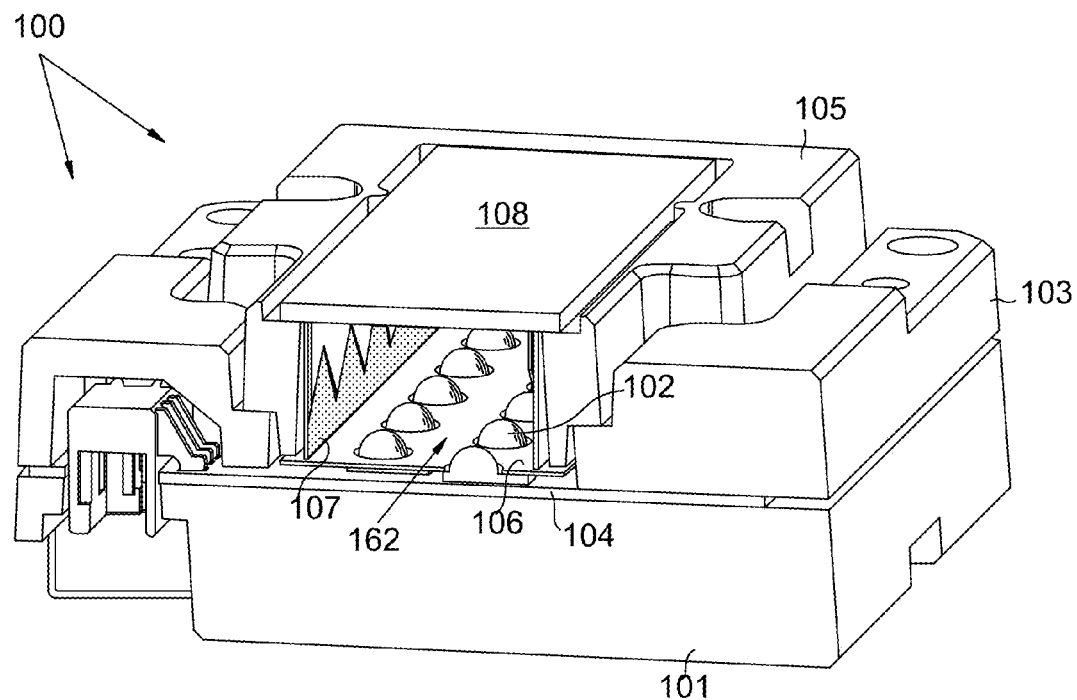
FIGS. 7A and 7B illustrate perspective, cross-sectional views of LED based illumination device as depicted in FIG. 1.
Figure 7B:
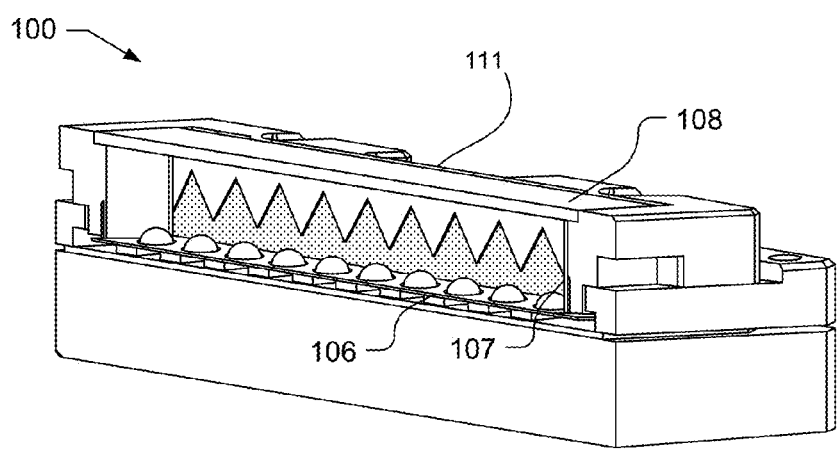

FIGS. 7A and 7B illustrate perspective, cross-sectional views of LED based illumination device 100 as depicted in FIG. 1. In this embodiment, the sidewall insert 107, output window 108, and bottom reflector insert 106 disposed on mounting board 104 define a color conversion cavity 162 in the LED based illumination device 100. A portion of light from the LEDs 102 is reflected within color conversion cavity 162 until it exits through output window 108. Reflecting the light within the cavity 162 prior to exiting the output window 108 has the effect of mixing the light and providing a more uniform distribution of the light that is emitted from the LED based illumination device 100. In addition, as light reflects within the cavity 162 prior to exiting the output window 108, an amount of light is color converted by interaction with a wavelength converting material included in the cavity 162.

Portions of cavity 162, such as the bottom reflector insert 106, sidewall insert 107, cavity body 105, output window 108, and other components placed inside the cavity (not shown) may be coated with or include a wavelength converting material. FIG. 7B illustrates portions of the sidewall insert 107 coated with a wavelength converting material. Furthermore, different components of cavity 162 may be coated with the same or a different wavelength converting material.

In one aspect, digital data is transmitted from an LED based illumination module by modulating the color of light emitted from the LED based illumination module, where the digital data is encoded in the modulation of the color of light. The modulation of the color of emitted light is performed such that the luminous flux of the light emitted from the LED based illumination module remains approximately constant while the color of the emitted light varies. In some examples, digital data is transmitted from an LED based illumination module by modulating the color of light emitted from the LED based illumination module while the luminous flux of the light emitted from the LED based illumination module varies by less than 10%. In some other examples, the luminous flux of the light emitted from the LED based illumination module varies by less than 5%. In some other examples, the luminous flux of the light emitted from the LED based illumination module varies by less than 1%.

In some embodiments, changes in the color of light emitted from an LED based illumination device 100 may be achieved by employing LEDs with different emission characteristics (e.g., different colored LEDs). By controlling the relative flux emitted from different zones of LEDs (e.g., by independently controlling current supplied to LEDs having different emission characteristics), changes in color may be achieved while maintaining the overall flux level approximately constant. In one embodiment, one zone of LEDs may include one or more red, orange, yellow, or green-emitting LEDs, while another zone of LEDs includes only blue-emitting LEDs. In another embodiment, one zone of LEDs may include one or more ultraviolet-emitting LEDs, while another zone of LEDs includes only blue-emitting LEDs. The aforementioned embodiments are provided by way of non-limiting example, as many other combinations of different LEDs may be contemplated to realize a modulated color output.

In some other embodiments, changes in the color of light emitted from an LED based illumination device 100 may be achieved by employing LEDs with similar emission characteristics (e.g., all blue emitting LEDs), or different emission characteristics, that preferentially illuminate different color converting surfaces. By controlling the relative flux emitted from different zones of LEDs (e.g., by independently controlling current supplied to LEDs in different zones), changes in color may be achieved while maintaining the overall flux level approximately constant.

Figure 8:
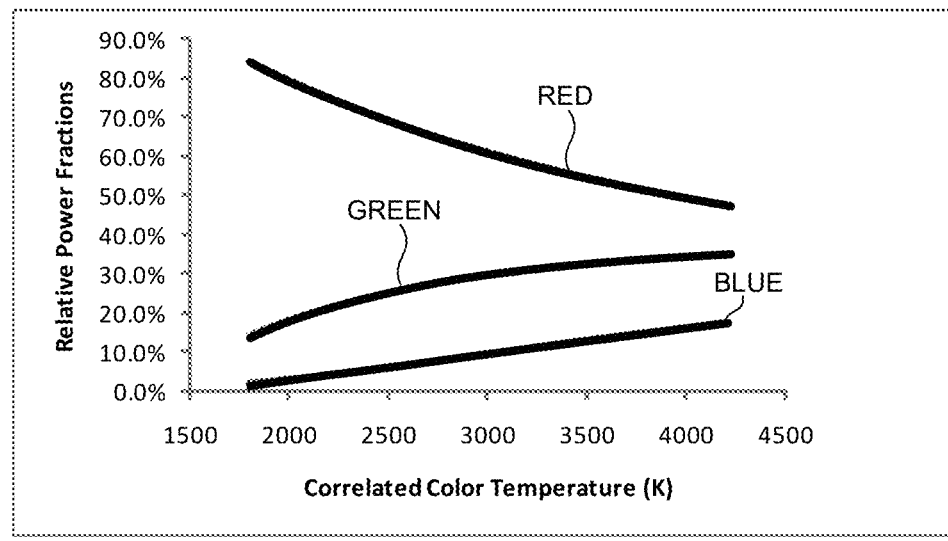
FIG. 8 illustrates a plot of simulated relative power fractions necessary to achieve a range of Correlated Color Temperatures (CCTs) for light emitted from an LED based illumination device.

FIG. 8 illustrates a plot of simulated relative power fractions necessary to achieve a range of Correlated Color Temperatures (CCTs) for light emitted from an LED based illumination device 100. The relative power fractions describe the relative contribution of three different light emitting elements within LED based illumination device 100: an array of blue emitting LEDs, an amount of green emitting phosphor (model BG201A manufactured by Mitsubishi, Japan), and an amount of red emitting phosphor (model BR102D manufactured by Mitsubishi, Japan). As illustrated in FIG. 8, as relative contributions from red, green, and blue emitting elements are changed, different colored emission from LED based illumination device 100 can be achieved.

As depicted in FIGS. 1-7B, light generated by LEDs 102 is generally emitted into a color conversion cavity such as color conversion cavity 162 depicted in FIG. 7A. However, various embodiments are introduced herein to preferentially direct light emitted from specific LEDs 102 to specific interior surface areas of LED based illumination device 100. In this manner, LED based illumination device 100 includes preferentially stimulated color converting surface areas. Light emitted by certain LEDs 102 is preferentially directed to an interior surface area of color conversion cavity 162 that includes a first wavelength converting material and light emitted from certain other LEDs 102 is preferentially directed to another interior surface area of color conversion cavity 162 that includes a second wavelength converting material. In this manner control over the color of light emitted from LED based illumination device 100 is achieved by controlling the light emitted from LEDs that preferentially illuminate different wavelength conversion materials.

Figure 9:
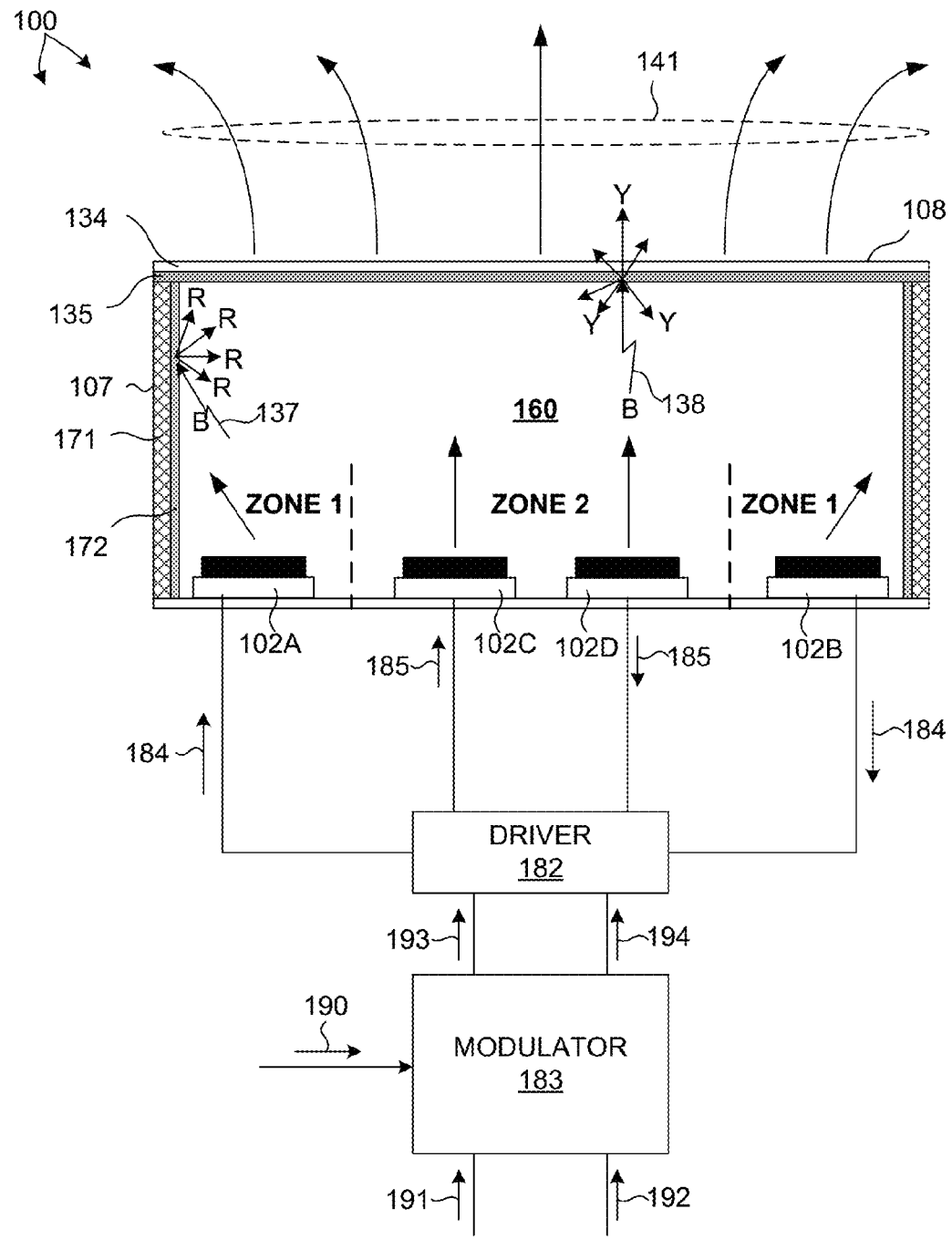
FIG. 9 is illustrative of a cross-sectional, side view of an LED based illumination device in one embodiment.

FIG. 9 is illustrative of a cross-sectional, side view of an LED based illumination device 100 in one embodiment. As illustrated, LED based illumination device 100 includes a plurality of LEDs 102A-102D, a sidewall 107 and an output window 108. Sidewall 107 includes a reflective layer 171 and a color converting layer 172. Color converting layer 172 includes a wavelength converting material (e.g., a red-emitting phosphor material). Output window 108 includes a transmissive layer 134 and a color converting layer 135. Color converting layer 135 includes a wavelength converting material with a different color conversion property than the wavelength converting material included in sidewall 107 (e.g., a yellow-emitting phosphor material). Color conversion cavity 162 is formed by the interior surfaces of the LED based illumination device 100 including the interior surface of sidewall 107 and the interior surface of output window 108.

The LEDs 102A-102D of LED based illumination device 100 emit light directly into color conversion cavity 162. Light is mixed and color converted within color conversion cavity 162 and the resulting combined light 141 is emitted by LED based illumination device 100.

Independently controllable current sources supply current to LEDs 102 in different preferential zones. In the example depicted in FIG. 9, a two-channel driver 182 supplies current 185 to LEDs 102C and 102D located in preferential zone 2. Similarly, two-channel driver 182 supplies current 184 to LEDs 102A and 102B located in preferential zone 1. By separately controlling the current supplied to LEDs located in different preferential zones, the color of combined light 141 output by LED based illumination module may be adjusted over a broad range of Correlated Color Temperatures (CCTs).

In the embodiment depicted in FIG. 9, LEDs 102 are located in different zones that preferentially illuminate different color converting surfaces of color conversion cavity 162. For example, as illustrated, LEDs 102A and 102B are located in zone 1. Light emitted from LEDs 102A and 102B located in zone 1 preferentially illuminates sidewall 107 because LEDs 102A and 102B are positioned in close proximity to sidewall 107. In some embodiments, more than fifty percent of the light output by LEDs 102A and 102B is directed to sidewall 107. In some other embodiments, more than seventy five percent of the light output by LEDs 102A and 102B is directed to sidewall 107. In some other embodiments, more than ninety percent of the light output by LEDs 102A and 102B is directed to sidewall 107.

As illustrated, LEDs 102C and 102D are located in zone 2. Light emitted from LEDs 102C and 102D in zone 2 is directed toward output window 108. In some embodiments, more than fifty percent of the light output by LEDs 102C and 102D is directed to output window 108. In some other embodiments, more than seventy five percent of the light output by LEDs 102C and 102D is directed to output window 108. In some other embodiments, more than ninety percent of the light output by LEDs 102C and 102D is directed to output window 108.

In one embodiment, light emitted from LEDs located in preferential zone 1 is directed to sidewall 107 that may include a red-emitting phosphor material, whereas light emitted from LEDs located in preferential zone 2 is directed to output window 108 that may include a green-emitting phosphor material and a red-emitting phosphor material. By adjusting the current 184 supplied to LEDs located in zone 1 relative to the current 185 supplied to LEDs located in zone 2, the amount of red light relative to green light included in combined light 141 may be adjusted. In addition, the amount of blue light relative to red light is also reduced because the a larger amount of the blue light emitted from LEDs 102 interacts with the red phosphor material of color converting layer 172 before interacting with the green and red phosphor materials of color converting layer 135. In this manner, the probability that a blue photon emitted by LEDs 102 is converted to a red photon is increased as current 184 is increased relative to current 185. Thus, control of currents 184 and 185 may be used to tune the CCT of light emitted from LED based illumination device 100 in accordance with the proportions indicated in FIG. 8.

In some embodiments, LEDs 102A and 102B in zone 1 may be selected with emission properties that interact efficiently with the wavelength converting material included in sidewall 107. For example, the emission spectrum of LEDs 102A and 102B in zone 1 and the wavelength converting material in sidewall 107 may be selected such that the emission spectrum of the LEDs and the absorption spectrum of the wavelength converting material are closely matched. This ensures highly efficient color conversion (e.g., conversion to red light). Similarly, LEDs 102C and 102D in zone 2 may be selected with emission properties that interact efficiently with the wavelength converting material included in output window 108. For example, the emission spectrum of LEDs 102C and 102D in zone 2 and the wavelength converting material in output window 108 may be selected such that the emission spectrum of the LEDs and the absorption spectrum of the wavelength converting material are closely matched. This ensures highly efficient color conversion (e.g., conversion to red and green light).

Furthermore, employing different zones of LEDs that each preferentially illuminates a different color converting surface minimizes the occurrence of an inefficient, two-step color conversion process. By way of example, a photon 138 generated by an LED (e.g., blue, violet, ultraviolet, etc.) from zone 2 is directed to color converting layer 135. Photon 138 interacts with a wavelength converting material in color converting layer 135 and is converted to a Lambertian emission of color converted light (e.g., green light). By minimizing the content of red-emitting phosphor in color converting layer 135, the probability is increased that the back reflected red and green light will be reflected once again toward the output window 108 without absorption by another wavelength converting material. Similarly, a photon 137 generated by an LED (e.g., blue, violet, ultraviolet, etc.) from zone 1 is directed to color converting layer 172. Photon 137 interacts with a wavelength converting material in color converting layer 172 and is converted to a Lambertian emission of color converted light (e.g., red light). By minimizing the content of green-emitting phosphor in color converting layer 172, the probability is increased that the back reflected red light will be reflected once again toward the output window 108 without reabsorption.

In another embodiment, LEDs 102 positioned in zone 2 of FIG. 8 are ultraviolet emitting LEDs, while LEDs 102 positioned in zone 1 of FIG. 8 are blue emitting LEDs. Color converting layer 172 includes any of a yellow-emitting phosphor and a green-emitting phosphor. Color converting layer 135 includes a red-emitting phosphor. The yellow and/or green emitting phosphors included in sidewall 107 are selected to have narrowband absorption spectra centered near the emission spectrum of the blue LEDs of zone 1, but far away from the emission spectrum of the ultraviolet LEDs of zone 2. In this manner, light emitted from LEDs in zone 2 is preferentially directed to output window 108, and undergoes conversion to red light. In addition, any amount of light emitted from the ultraviolet LEDs that illuminates sidewall 107 results in very little color conversion because of the insensitivity of these phosphors to ultraviolet light. In this manner, the contribution of light emitted from LEDs in zone 2 to combined light 141 is almost entirely red light. In this manner, the amount of red light contribution to combined light 141 can be influenced by current supplied to LEDs in zone 2. Light emitted from blue LEDs positioned in zone 1 is preferentially directed to sidewall 107 and results in conversion to green and/or yellow light. In this manner, the contribution of light emitted from LEDs in zone 1 to combined light 141 is a combination of blue and yellow and/or green light. Thus, the amount of blue and yellow and/or green light contribution to combined light 141 can be influenced by current supplied to LEDs in zone 1.

Figure 10:
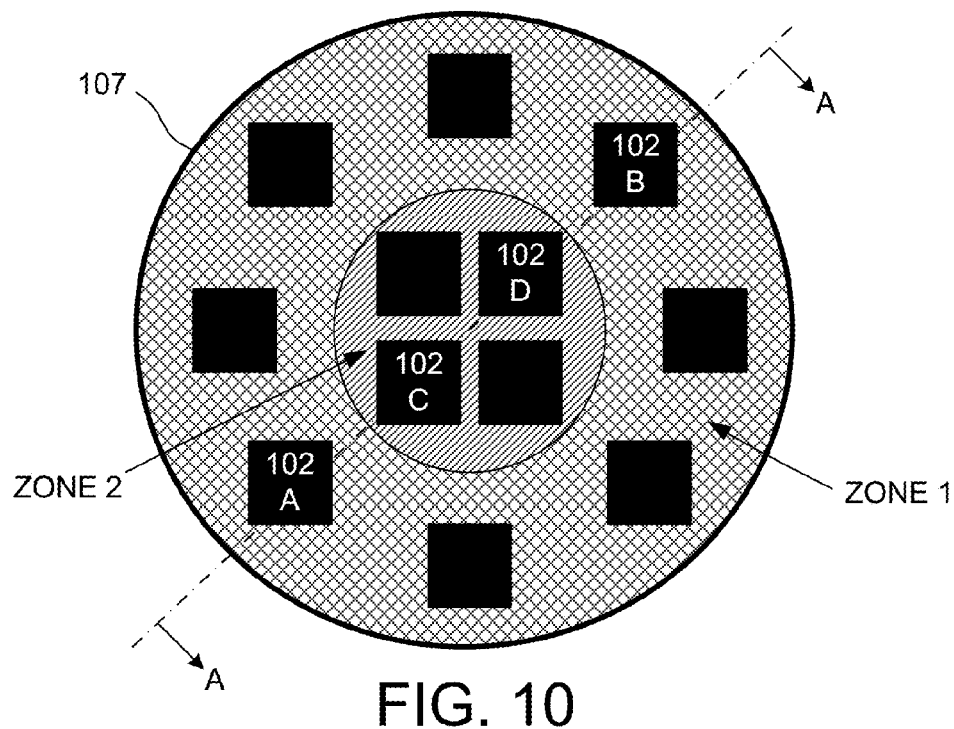
FIG. 10 is illustrative of a top view of LED based illumination device depicted in FIG. 9.

FIG. 10 is illustrative of a top view of LED based illumination device 100 depicted in FIG. 9. Section A depicted in FIG. 10 is the cross-sectional view depicted in FIG. 9. As depicted, in this embodiment, LED based illumination device 100 is circular in shape as illustrated in the exemplary configurations depicted in FIG. 2 and FIG. 3. In this embodiment, LED based illumination device 100 is divided into annular zones (e.g., zone 1 and zone 2) that include different groups of LEDs 102. As illustrated, zones 1 and zones 2 are separated and defined by their relative proximity to sidewall 107. Although, LED based illumination device 100, as depicted in FIGS. 9 and 10, is circular in shape, other shapes may be contemplated. For example, LED based illumination device 100 may be polygonal in shape. In other embodiments, LED based illumination device 100 may be any other closed shape (e.g., elliptical, etc.). Similarly, other shapes may be contemplated for any zones of LED based illumination device 100.

Figure 11:
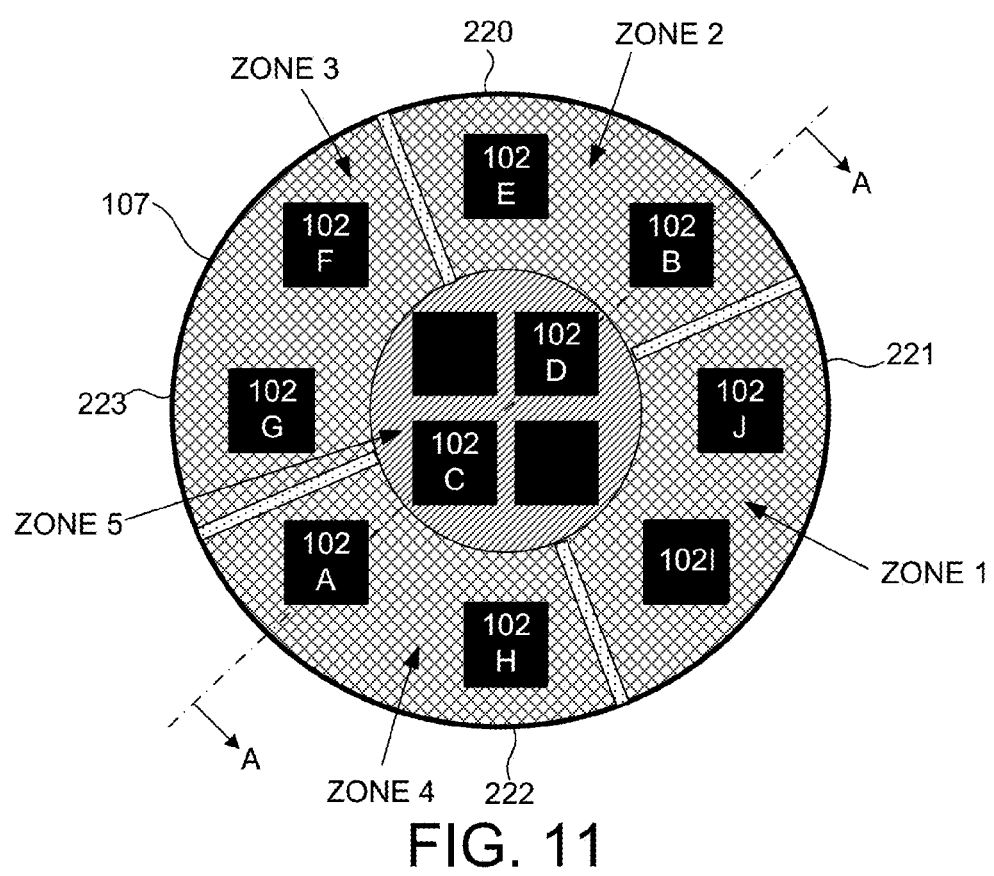
FIG. 11 is illustrative of a top view of an LED based illumination device divided into five zones.

As depicted in FIG. 10, LED based illumination device 100 is divided into two zones. However, more zones may be contemplated. For example, as depicted in FIG. 11, LED based illumination device 100 is divided into five zones. Zones 1-4 subdivide sidewall 107 into a number of distinct color converting surfaces. In this manner light emitted from LEDs 102I and 102J in zone 1 is preferentially directed to color converting surface 221 of sidewall 107, light emitted from LEDs 102B and 102E in zone 2 is preferentially directed to color converting surface 220 of sidewall 107, light emitted from LEDs 102F and 102G in zone 3 is preferentially directed to color converting surface 223 of sidewall 107, and light emitted from LEDs 102A and 102H in zone 4 is preferentially directed to color converting surface 222 of sidewall 107. The five zone configuration depicted in FIG. 11 is provided by way of example. However, many other numbers and combinations of zones may be contemplated.

In one embodiment, color converting surface zones 221 and 223 in zones 1 and 3, respectively may include a densely packed yellow and/or green emitting phosphor, while color converting surfaces 220 and 222 in zones 2 and 4, respectively, may include a sparsely packed yellow and/or green emitting phosphor. In this manner, blue light emitted from LEDs in zones 1 and 3 may be almost completely converted to yellow and/or green light, while blue light emitted from LEDs in zones 2 and 4 may only be partially converted to yellow and/or green light. In this manner, the amount of blue light contribution to combined light 141 may be controlled by independently controlling the current supplied to LEDs in zones 1 and 3 and to LEDs in zones 2 and 4. More specifically, if a relatively large contribution of blue light to combined light 141 is desired, a large current may be supplied to LEDs in zones 2 and 4, while a current supplied to LEDs in zones 1 and 3 is minimized. However, if relatively small contribution of blue light is desired, only a limited current may be supplied to LEDs in zones 2 and 4, while a large current is supplied to LEDs in zones 1 and 3. In this manner, the relative contributions of blue light and yellow and/or green light to combined light 141 may be independently controlled. This may be useful to modulate the light output generated by LED based illumination device 100 to transmit information from LED based illumination device 100.

The aforementioned embodiments are provided by way of non-limiting example. Many other combinations of different zones of independently controlled LEDs preferentially illuminating different color converting surface areas may be contemplated to modulate the light output generated by LED based illumination device 100 to transmit information.

In one embodiment, depicted in FIG. 9, an LED based illumination device 100 includes a modulator 183 that receives a nominal current command signal 191, $i_1$, and a nominal current command signal 192, $i_2$. Under nominal operating conditions, command signals 191 and 192 would be received by driver 182, and driver 182 would supply current 184 to LEDs in zone 1 and current 185 to LEDs in zone 2, based on current command signals 191 and 192, respectively.

In another aspect, modulator 183 receives an amount of data 190 to be transmitted from LED based illumination device 100 and modulates current command signals 191 and 192 to change the color of light emitted from LED based illumination device 100 based the data to be transmitted, where the digital data is encoded in the modulation of the color of light emitted from LED based illumination device 100.

In the depicted embodiment, modulator 183 generates a modulated current command signal 193, $i_1'$, based on current command signal 191 and generates a modulated current command signal 194, $i_2'$, based on current command signal 192 such that the change in flux induced by the modulated current command signal 193 is offset by the change in flux induced by the modulated current command signal 194. In this manner, the luminous flux generated by LED based illumination device 100 remains unchanged despite variations in color caused by changes in current supplied to LEDs in zones 1 and 2.

Figure 12A:
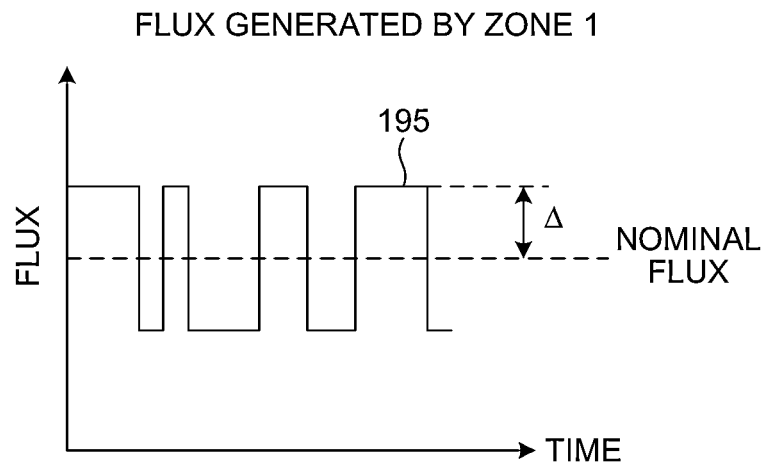
FIGS. 12A and 12B illustrate an exemplary traces of the flux generated by LED based illumination device based on light generated from LEDs in different zones.

FIG. 12A illustrates an exemplary trace 195 of the flux generated by LED based illumination device 100 based on light generated from LEDs in zone 1. As illustrated in FIG. 12A, the flux varies about a nominal flux (e.g., the flux associated with nominal current, $i_1$). In the depicted example, the flux level resides in one of two states, depending on time. In one state, the flux level is greater than the nominal value by an amount, Δ, and in the second state, the flux level is less than the nominal value by the same amount, Δ.

Figure 12B:
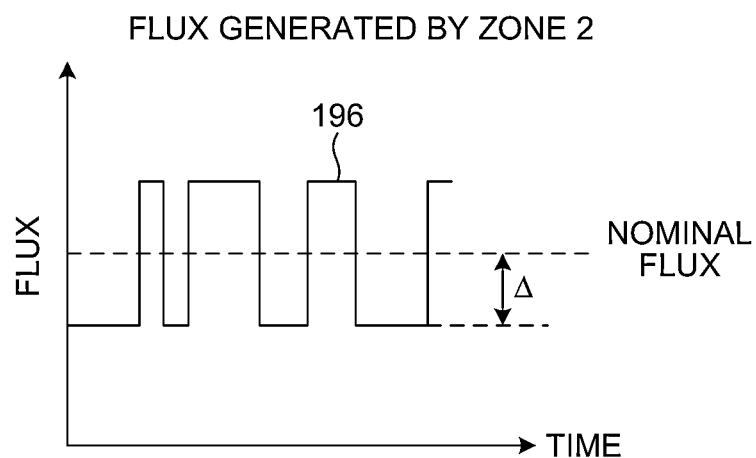

Similarly, FIG. 12B illustrates an exemplary trace 196 of the flux generated by LED based illumination device 100 based on light generated from LEDs in zone 2. As illustrated in FIG. 12B, the flux varies about a nominal flux (e.g., the flux associated with nominal current, $i_2$). In the depicted example, the flux level resides in one of two states, depending on time. In one state, the flux level is greater than the nominal value by an amount, Δ, and in the second state, the flux level is less than the nominal value by the same amount, Δ.

Modulator 183 generates modulated current command signals 193 and 194 such that the flux generated by LED based illumination device 100 remains approximately constant. Thus, at the moment that the flux generated by LEDs in zone 1 transitions from a high state to a low state, the flux generated by LEDs in zone 2 transitions from a low state to a high state. Since the difference in flux between both transitions is the same, their effects offset, and LED based illumination device 100 continues to emit light at the nominal flux level.

Meanwhile, however, the color generated by LED based illumination device 100 changes based on the state of LEDs in zone 1 and the state of LEDs in zone 2.

Figure 13:
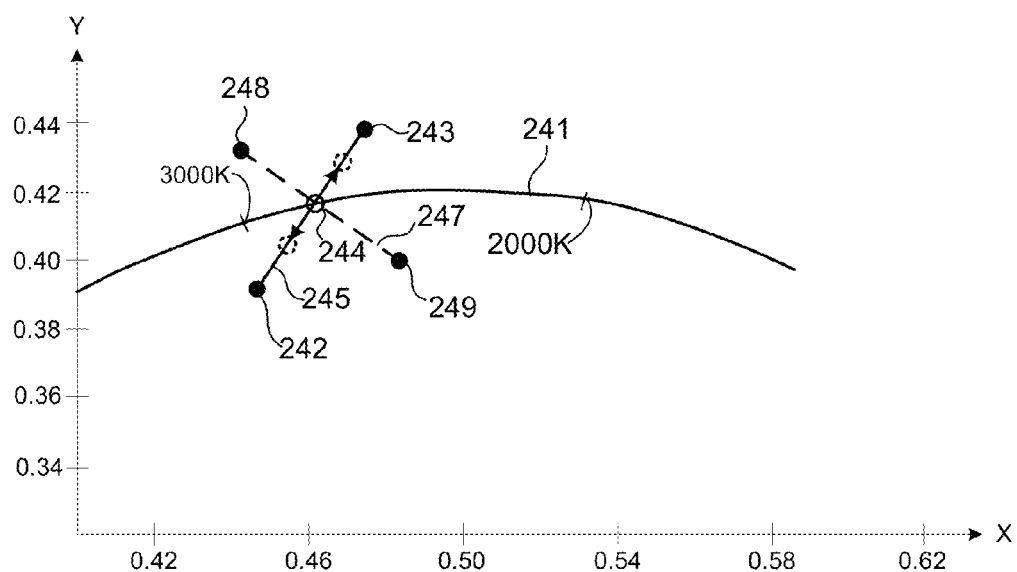
FIG. 13 illustrates a range of color points achievable by the LED based illumination device depicted in FIGS. 9 and 10.

FIG. 13 illustrates a range of color points achievable by the LED based illumination device 100 depicted in FIGS. 9 and 10, with respect to a Planckian locus 241. When a current is supplied to LEDs in zone 1, and no current is supplied to LEDs in zone 2, light 141 emitted from LED based illumination device 100 has a color point 243 illustrated in FIG. 13.

When a current is supplied to LEDs in zone 2, and no current is supplied to LEDs in zone 1, light 141 emitted from LED based illumination device 100 has a color point 242 illustrated in FIG. 13.

By adjusting the currents supplied to LEDs located in zones 1 and 2, the light 141 emitted from LED based illumination device 100 can be tuned to any color point along the line 245 connecting color points 242 and 243. In this manner, the light 141 emitted from LED based illumination device 100 can be modulated to change color between color points 242 and 243 based on the relative current supplied to LEDs in zones 1 and 2. By way of example, color point 244 corresponds to the color of light emitted from LED based illumination device 100 at the nominal supply currents, $i_1$ and $i_2$. As the current values are modulated, the color point of light emitted from LED based illumination device 100 varies along the line 245.

Modulator 183 may be configured to modulate the color of light generated by LED based illumination device 100 to transmit digital data using any suitable modulation scheme. By way of non-limiting example, amplitude modulation, frequency modulation, pulse width modulation, phase modulation, etc., may be contemplated. Additionally, more complex modulation schemes, such as quadrature amplitude modulation (QAM) may be contemplated with a second line 247 that is approximately orthogonal to line 245 in FIG. 13, e.g., produced using additional zones that cause light 141 emitted from the LED based illumination device 100 to be tuned to any color point between points 248 and 249 using appropriate supply currents to zones 1 and 2 and the additional zones. The selected modulation scheme is applied subject to the constraint that the flux generated by LED based illumination device 100 should be maintained at an approximately constant level during a particular data transmission interval.

In an illuminated environment populated by humans, it is desirable to maintain a constant flux level to avoid disturbing people within view of the illumination light. Studies have shown that humans can be sensitive to rapidly changing flux levels. In some cases, sensitivity to flux levels changing with a frequency up to 2,000 hz have been observed. In extreme cases, this sensitivity leads to physical sickness. Thus, in situations where it is desirable to communicate digital data via visible light at frequencies below 2,000 hertz, it may be preferable to modulate the color of light generated by the illumination device, rather than flux.

Figure 14:
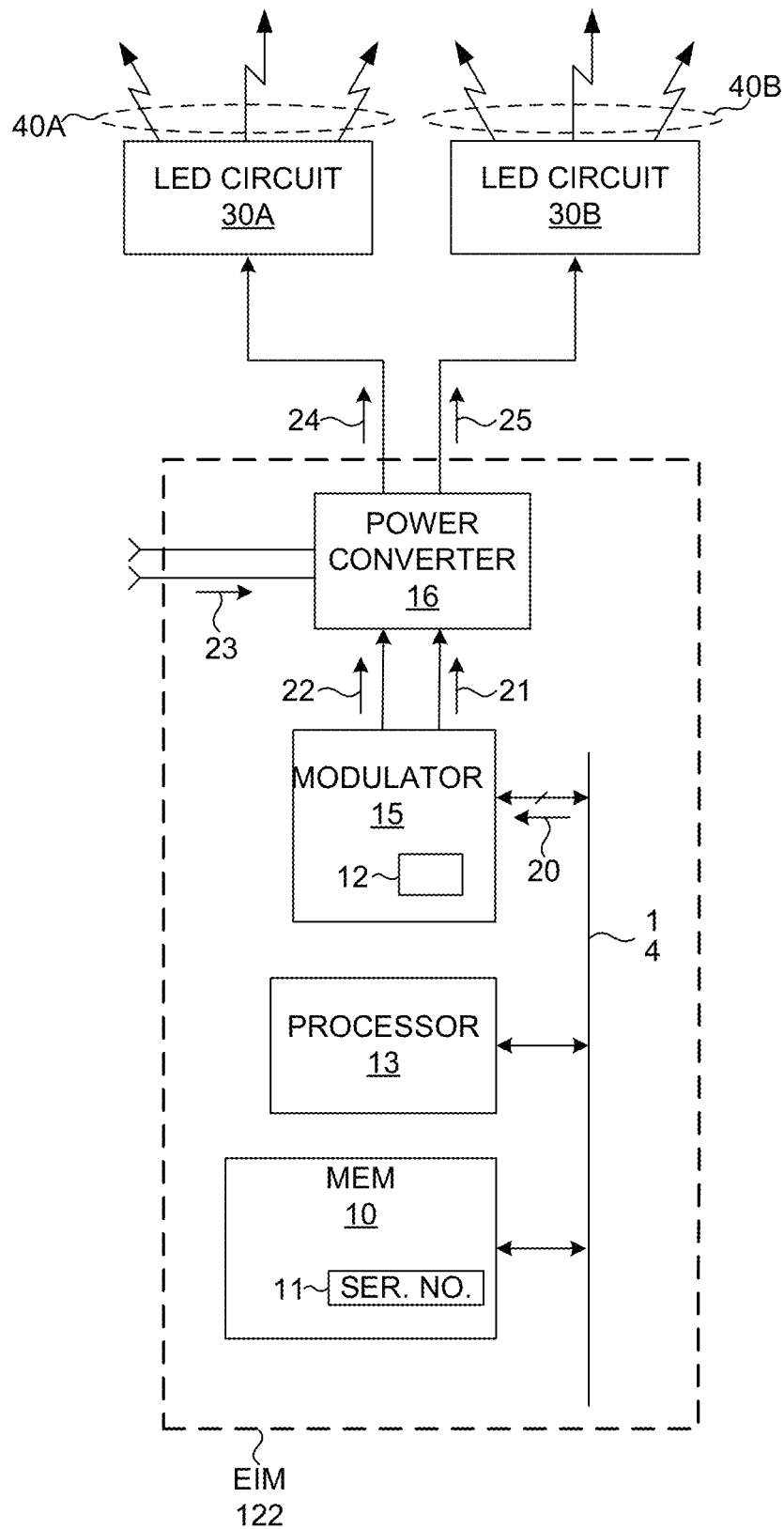
FIG. 14 is a diagram illustrative of an electronic interface module (EIM) including color modulation functionality in one embodiment.

FIG. 14 is a diagram illustrative of an electronic interface module (EIM) 122 including color modulation functionality in one embodiment. As depicted in FIG. 14, bus 14 is communicatively coupled to elements of EIM 122 (e.g., memory 10, processor 13, and modulator 15 such that digital data may be communicated among these elements over bus 14. As depicted in FIG. 14, EIM 122 is coupled to LED circuits 30A and 30B. Light 40A emitted from LED circuit 30A results in different colored light emitted from an LED based illumination device 100 that includes LED circuits 30A and 30B than light 40B emitted from LED circuit 30B.

EIM 122 is configured to generate a significant amount of data useful to characterize its operation, the surrounding environment, and prospects for future operation. In one example, EIM 122 is configured to store a serial number in memory 11 that individually identifies the illumination device 100 to which EIM 122 is a part. In one example, memory 11 is an erasable programmable read-only memory (EPROM). A serial number that identifies illumination device 100 is programmed into EPROM 11 during manufacture. Other examples of information generated by EIM 122 include accumulated elapsed time of illumination device 100, LED failure, occupancy sensed by an occupancy sensor, flux sensed by an on-board flux sensor, temperature sensed by a temperature sensor, and a power failure condition.

EIM also includes a power converter 16 configured to receive power signals 23. Power converter 16 operates to perform power conversion to generate electrical signals to drive LED circuits 30A and 30B. In some embodiments, power converter 16 operates in a current control mode to supply a controlled amount of current to LED circuits within a predefined voltage range. In some embodiments, power converter 16 is a direct current to direct current (DC-DC) power converter. In these embodiments, power signals 23 may have a nominal voltage of 48 volts. Power signals 23 are stepped down in voltage by DC-DC power converter 16 to voltage levels that meet the voltage requirements of each LED circuit coupled to DC-DC converter 16.

In some other embodiments, power converter 16 is an alternating current to direct current (AC-DC) power converter. In yet other embodiments, power converter 16 is an alternating current to alternating current (AC-AC) power converter. In embodiments employing AC-AC power converter 16, LEDs generate light from AC electrical signals. In the embodiment depicted in FIG. 14, power converter 16 includes two channels. Each channel of power converter 16 supplies electrical power to one LED circuit of series connected LEDs. In one embodiment power converter 16 operates in a constant current mode. This is particularly useful where LEDs are electrically connected in series. In some other embodiments, power converter 16 may operate as a constant voltage source. This may be particularly useful where LEDs are electrically connected in parallel.

As depicted, power converter 16 is coupled to modulator 15. Digital messages 20 are generated by operation of processor 13 and communicated to modulator 15 over bus 14. In one example, processor 13 reads the serial number stored in memory 11, and communicates the serial number to modulator 15. Modulator 15 generates modulated current command signals 21 and 22 based on the digital signals 20, and communicates the signals to power converter 16. In one embodiment, modulator 15 includes a memory 12 storing instructions that when executed by processor 13, or a processor on board modulator 15, cause the modulator 15 to generate modulated current command signals 21 and 22 as described herein.

Power converter 16 adjusts the current communicated to LED circuits 30A and 30B in response to the modulated current command signals 21 and 22. In this manner, power converter 16 modulates the current communicated to coupled LED circuits 30A and 30B in response to the received modulated current command signals 21 and 22. The serial number is communicated from EIM 122 by modulating the color output from the LED based illumination device. In some embodiments, power converter 16 is operable to receive digital data directly. In these embodiments, the functionality of modulator 15 is integrated with power converter 16.

Figure 15:
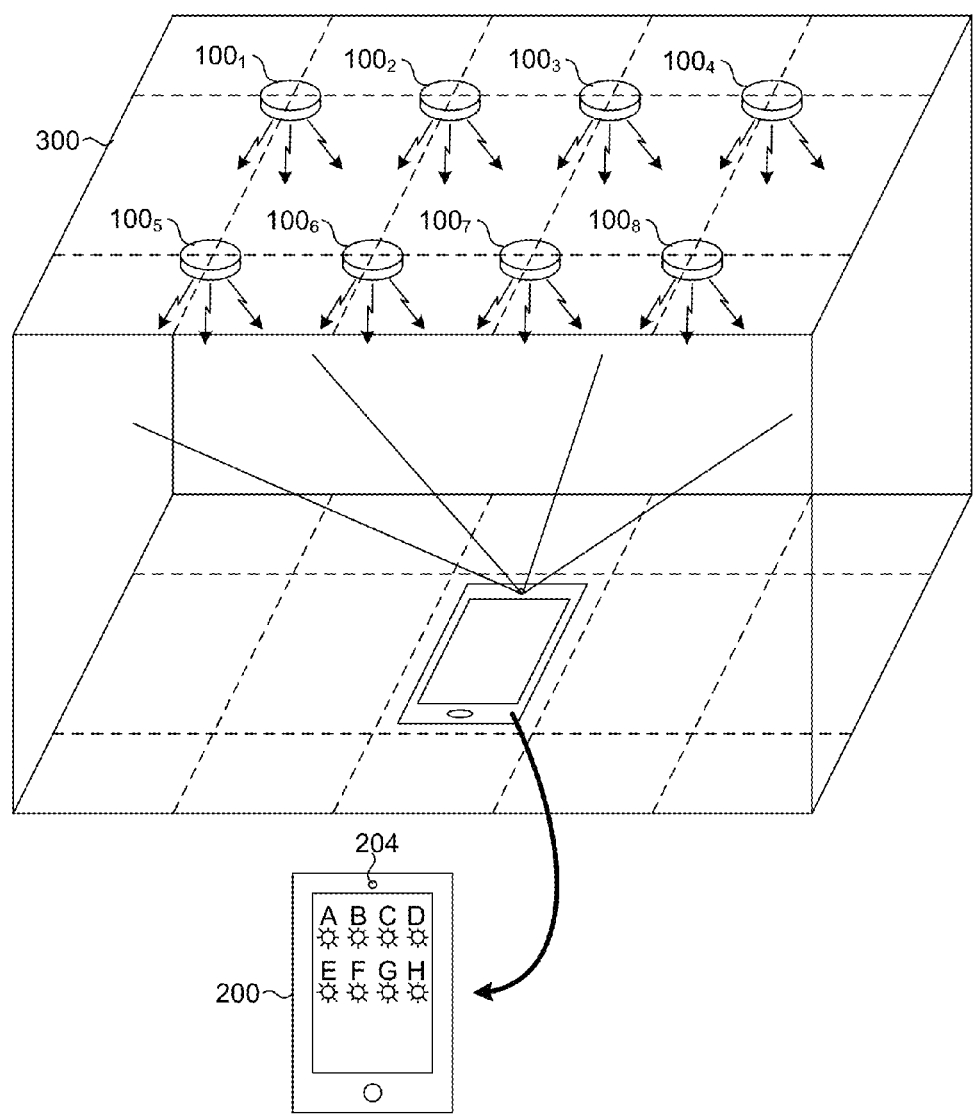
FIG. 15 is a diagram illustrating a room populated with LED based illumination modules.

FIG. 15 is a diagram illustrating a room 300 populated with LED based illumination modules $100_1$-$100_8$, which may be installed in a luminaire 150 (not shown in FIG. 15). In another aspect, a receiving device 200 receives an amount of light emitted from one or more LED based illumination devices, determines a signal indicative of the color of the received light, and demodulates the signal to determine digital data transmitted by the LED based illumination device.

Figure 16:
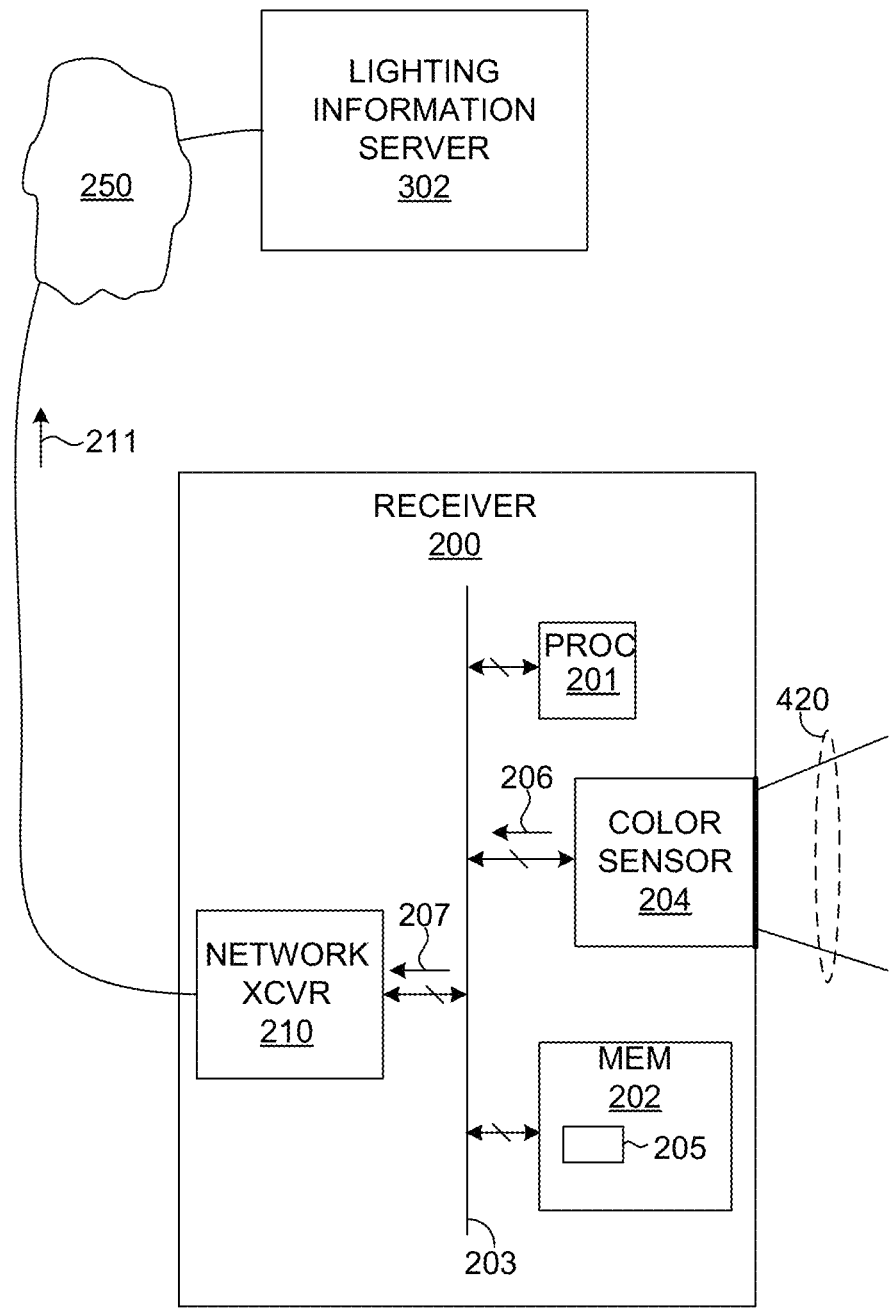
FIG. 16 illustrates a receiver that includes a color sensor configured to receive an amount of light generated by an LED based illumination device communicating digital information by color modulation.

As depicted in FIG. 16, receiver 200 includes a color sensor 204 configured to receive an amount of light 420 generated by an LED based illumination device 100 communicating digital information by color modulation. Color sensor 204 generates a signal 206 indicative of changes in color of received light 420. Bus 203 is communicatively coupled to elements of receiver 200 (e.g., memory 202, processor 201, network transceiver 210, and color sensor 204 such that digital data may be communicated among these elements over bus 203. Processor 201 executes instructions stored in memory 205 to demodulate the color signal 206 and decode the digital message communicated by the LED based illumination device. The digital message may be stored in memory 202. The digital message 207 may also be communicated to a lighting information server 302 via network transceiver 210. Receiver 200 also includes a network transceiver 210 configured as the network interface between receiver 200 and the network 250 operating in accordance with an internet protocol. In one example, a digital communications packet 211 including digital message 207 is assembled by network transceiver 210 and communicated from receiver 200 to lighting information server 302 over network 250.

As depicted in FIG. 16, receiver 200 is communicatively coupled to lighting information server 302. In some examples, a communications link is established between lighting information server 302 and receiver 200 over the network 250. In some examples, the communication link is established over a local area network with controlled access to the internet. In some other examples, the communication link is established over a wireless network. In general, receiver 200 is coupled to a network operating in accordance with the internet protocol (IP). In some embodiments, the internet protocol is internet protocol version six (IPv6). In this manner, the advantages of scale (e.g., security, cost, speed, etc.) of an IP based network are leveraged to some extent in the lighting information system.

In general, any change in color generated by an LED based illumination device 100 may be employed to communicate information. However, in some examples, LED based illumination device 100 may be configured to modulate color along a line of constant CCT in a CIE 1931 color space. In this manner, information is communicated from an LED based illumination device based on changes in visible light emitted from the module without varying flux and without varying color temperature.

The aforementioned embodiments are provided by way of example. Many other combinations of different zones of independently controlled LEDs preferentially illuminating different color converting surface areas may be contemplated to achieve data communication via color modulation.

Figure 17:
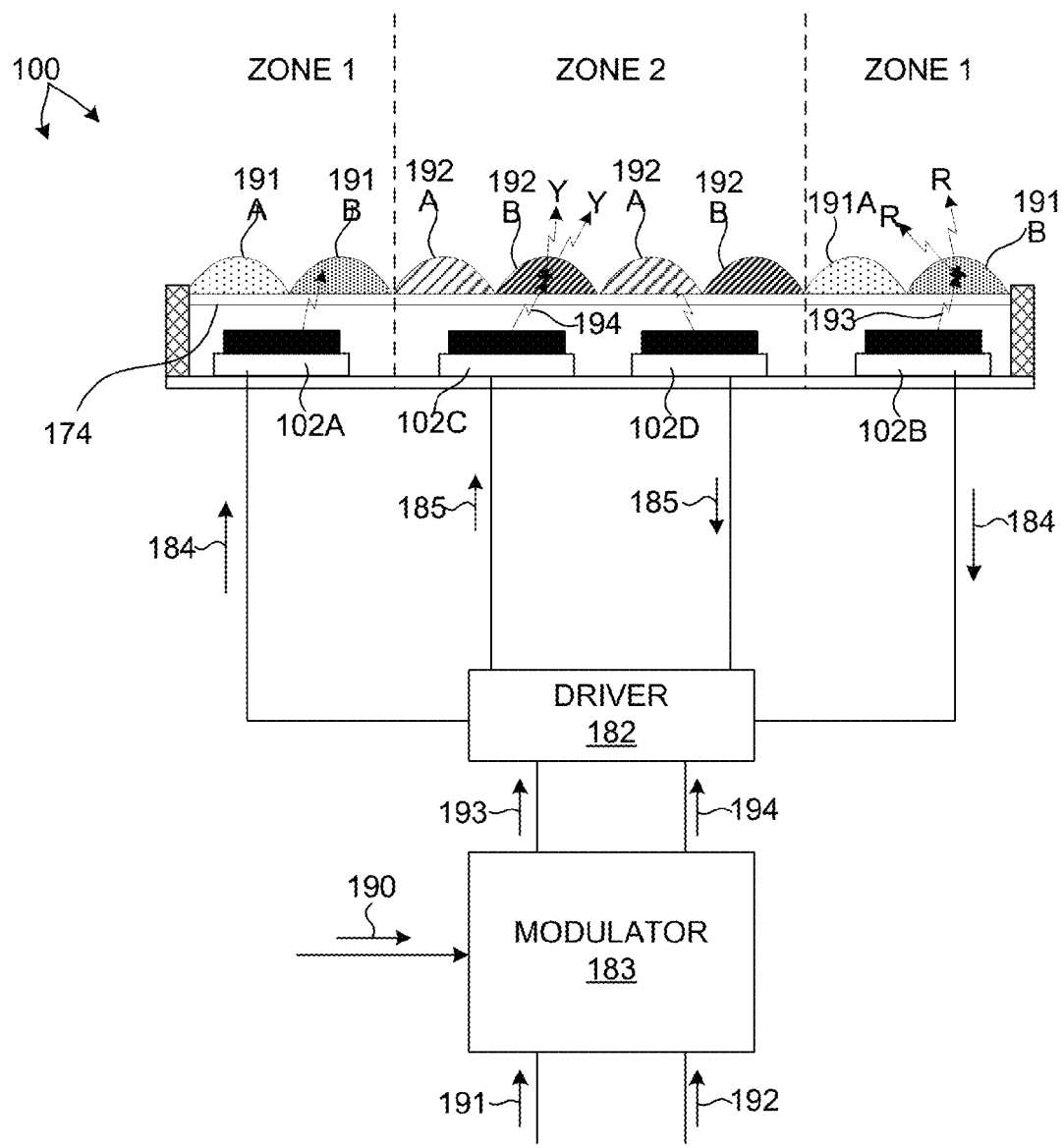
FIGS. 17 and 18 illustrate a cross-sectional view and top view of an LED based illumination device in another embodiment.
Figure 18:
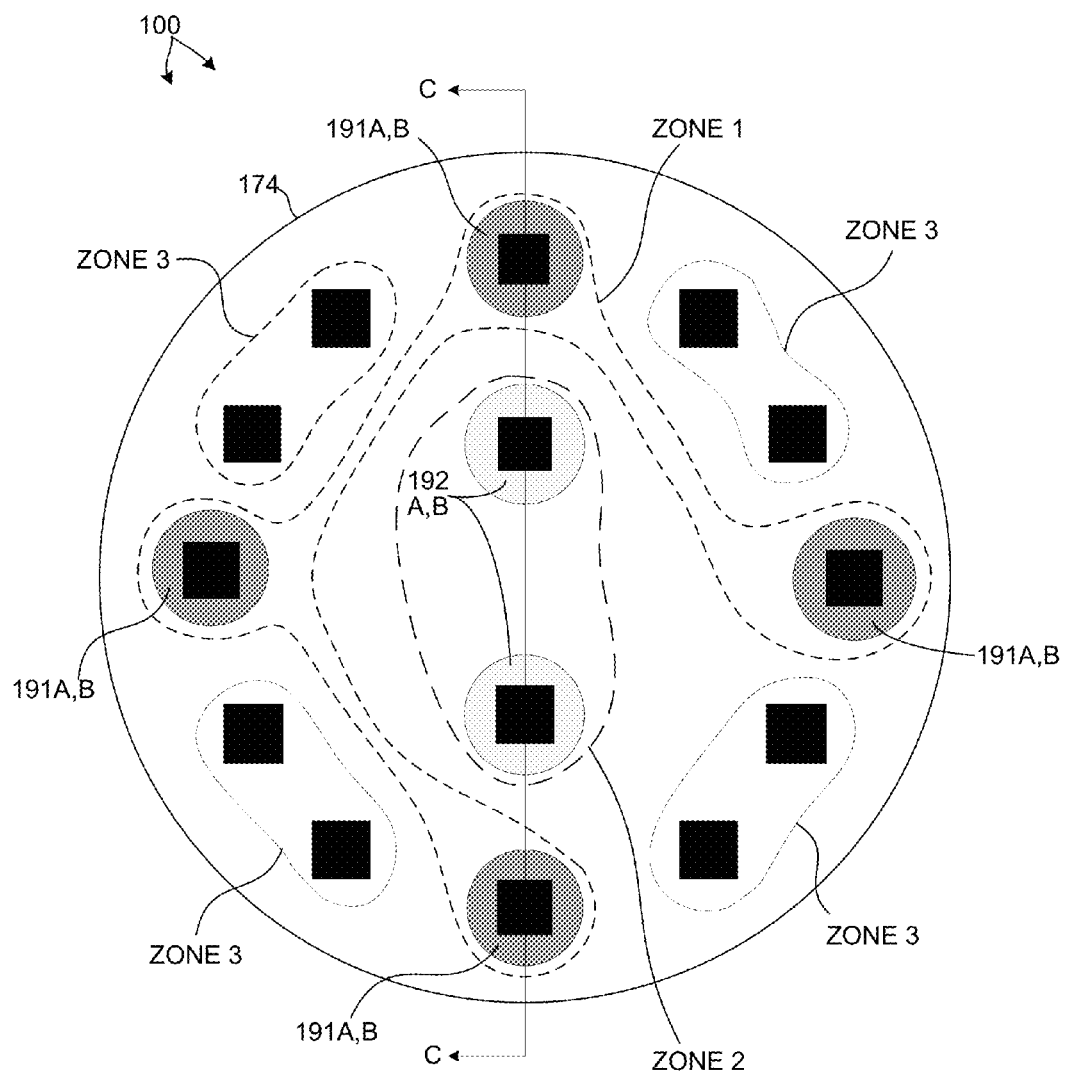

By way of non-limiting example, FIG. 18 illustrates a top view of the LED based illumination device 100 in another embodiment. FIG. 17 depicts a cross-sectional view of LED based illumination device 100 along section line, C, depicted in FIG. 18. As illustrated in FIG. 17, wavelength converting materials 191A and 191B cover a portion of transmissive plate 174 and are preferentially illuminated by LEDs in zone 1. Wavelength converting materials 192A and 192B cover another portion of transmissive plate 174 and are preferentially illuminated by LEDs in zone 2. LEDs in zone 3, preferentially illuminate other wavelength converting materials present in different areas of transmissive plate 174 (not shown).

In some embodiments, components of color conversion cavity 162 may be constructed from or include a PTFE material. In some examples the component may include a PTFE layer backed by a reflective layer such as a polished metallic layer. The PTFE material may be formed from sintered PTFE particles. In some embodiments, portions of any of the interior facing surfaces of color converting cavity 162 may be constructed from a PTFE material. In some embodiments, the PTFE material may be coated with a wavelength converting material. In other embodiments, a wavelength converting material may be mixed with the PTFE material.

In other embodiments, components of color conversion cavity 162 may be constructed from or include a reflective, ceramic material, such as ceramic material produced by Cer-Flex International (The Netherlands). In some embodiments, portions of any of the interior facing surfaces of color converting cavity 162 may be constructed from a ceramic material. In some embodiments, the ceramic material may be coated with a wavelength converting material.

In other embodiments, components of color conversion cavity 162 may be constructed from or include a reflective, metallic material, such as aluminum or Miro® produced by Alanod (Germany). In some embodiments, portions of any of the interior facing surfaces of color converting cavity 162 may be constructed from a reflective, metallic material. In some embodiments, the reflective, metallic material may be coated with a wavelength converting material.

In other embodiments, (components of color conversion cavity 162 may be constructed from or include a reflective, plastic material, such as Vikuiti™ ESR, as sold by 3M (USA), Lumirror™ E60L manufactured by Toray (Japan), or microcrystalline polyethylene terephthalate (MCPET) such as that manufactured by Furukawa Electric Co. Ltd. (Japan). In some embodiments, portions of any of the interior facing surfaces of color converting cavity 162 may be constructed from a reflective, plastic material. In some embodiments, the reflective, plastic material may be coated with a wavelength converting material.

Cavity 162 may be filled with a non-solid material, such as air or an inert gas, so that the LEDs 102 emits light into the non-solid material. By way of example, the cavity may be hermetically sealed and Argon gas used to fill the cavity. Alternatively, Nitrogen may be used. In other embodiments, cavity 162 may be filled with a solid encapsulate material. By way of example, silicone may be used to fill the cavity. In some other embodiments, color converting cavity 162 may be filled with a fluid to promote heat extraction from LEDs 102. In some embodiments, wavelength converting material may be included in the fluid to achieve color conversion throughout the volume of color converting cavity 162.

The PTFE material is less reflective than other materials that may be used to construct or include in components of color conversion cavity 162 such as Miro® produced by Alanod. In one example, the blue light output of an LED based illumination device 100 constructed with uncoated Miro® sidewall insert 107 was compared to the same module constructed with an uncoated PTFE sidewall insert 107 constructed from sintered PTFE material manufactured by Berghof (Germany). Blue light output from illumination device 100 was decreased 7% by use of a PTFE sidewall insert. Similarly, blue light output from illumination device 100 was decreased 5% compared to uncoated Miro® sidewall insert 107 by use of an uncoated PTFE sidewall insert 107 constructed from sintered PTFE material manufactured by W.L. Gore (USA). Light extraction from the illumination device 100 is directly related to the reflectivity inside the cavity 162, and thus, the inferior reflectivity of the PTFE material, compared to other available reflective materials, would lead away from using the PTFE material in the cavity 162. Nevertheless, the inventors have determined that when the PTFE material is coated with phosphor, the PTFE material unexpectedly produces an increase in luminous output compared to other more reflective materials, such as Miro®, with a similar phosphor coating. In another example, the white light output of an illumination device 100 targeting a correlated color temperature (CCT) of 4,000 Kelvin constructed with phosphor coated Miro® sidewall insert 107 was compared to the same module constructed with a phosphor coated PTFE sidewall insert 107 constructed from sintered PTFE material manufactured by Berghof (Germany). White light output from illumination device 100 was increased 7% by use of a phosphor coated PTFE sidewall insert compared to phosphor coated Miro®. Similarly, white light output from illumination device 100 was increased 14% compared to phosphor coated Miro® sidewall insert 107 by use of a PTFE sidewall insert 107 constructed from sintered PTFE material manufactured by W.L. Gore (USA). In another example, the white light output of an illumination device 100 targeting a correlated color temperature (CCT) of 3,000 Kelvin constructed with phosphor coated Miro® sidewall insert 107 was compared to the same module constructed with a phosphor coated PTFE sidewall insert 107 constructed from sintered PTFE material manufactured by Berghof (Germany). White light output from illumination device 100 was increased 10% by use of a phosphor coated PTFE sidewall insert compared to phosphor coated Miro®. Similarly, white light output from illumination device 100 was increased 12% compared to phosphor coated Miro® sidewall insert 107 by use of a PTFE sidewall insert 107 constructed from sintered PTFE material manufactured by W.L. Gore (USA).

Thus, it has been discovered that, despite being less reflective, it is desirable to construct phosphor covered portions of the light mixing cavity 162 from a PTFE material. Moreover, the inventors have also discovered that phosphor coated PTFE material has greater durability when exposed to the heat from LEDs, e.g., in a light mixing cavity 162, compared to other more reflective materials, such as Miro®, with a similar phosphor coating.

Although certain specific embodiments are described above for instructional purposes, the teachings of this patent document have general applicability and are not limited to the specific embodiments described above. For example, any component of color conversion cavity 162 may be patterned with phosphor. Both the pattern itself and the phosphor composition may vary. In one embodiment, the illumination device may include different types of phosphors that are located at different areas of a light mixing cavity 162. For example, a red phosphor may be located on either or both of the insert 107 and the bottom reflector insert 106 and yellow and green phosphors may be located on the top or bottom surfaces of the output window 108 or embedded within the output window 108. In one embodiment, different types of phosphors, e.g., red and green, may be located on different areas on the sidewalls 107. For example, one type of phosphor may be patterned on the output window 108 at a first area, e.g., in stripes, spots, or other patterns, while another type of phosphor is located on a different second area of the output window 108. If desired, additional phosphors may be used and located in different areas in the cavity 162. Additionally, if desired, only a single type of wavelength converting material may be used and patterned in the cavity 162, e.g., on the sidewalls. In another example, cavity body 105 is used to clamp mounting board 104 directly to mounting base 101 without the use of mounting board retaining ring 103. In other examples mounting base 101 and heat sink 120 may be a single component. In another example, LED based illumination device 100 is depicted in FIGS. 1-3 as a part of a luminaire 150. As illustrated in FIG. 3, LED based illumination device 100 may be a part of a replacement lamp or retrofit lamp. But, in another embodiment, LED based illumination device 100 may be shaped as a replacement lamp or retrofit lamp and be considered as such. Accordingly, various modifications, adaptations, and combinations of various features of the described embodiments can be practiced without departing from the scope of the invention as set forth in the claims.

What is claimed is:

1. A method of transmitting information from an LED based illumination device, comprising:
   receiving an amount of digital data; and
   modulating a color of light emitted from the LED based illumination device based on the digital data such that a luminous flux of the light emitted from the LED based illumination device remains approximately constant while the color of light varies, wherein the modulating the color of light emitted from the LED based illumination device involves,
       modulating a first current provided to a first LED, and
       modulating a second current provided to a second LED; and
   wherein the first LED preferentially illuminates a first wavelength converting material, and wherein the second LED preferentially illuminates a second wavelength converting material that is different from the first wavelength converting material.

2. The method of claim 1, wherein the first LED and the second LED have different light emission characteristics.

3. The method of claim 1, wherein a first colored light is emitted from the LED based illumination device based on the light emitted from the first LED, wherein a second colored light that is different from the first colored light is emitted from the LED based illumination device based on the light emitted from the second LED, and wherein the color of light emitted from the LED based illumination device is based on a combination of the first colored light and the second colored light.

4. The method of claim 3, wherein the first current and the second current are modulated such that a luminous flux of the combination of the first colored light and the second colored light is approximately constant.

5. The method of claim 1, wherein the first and second wavelength converting materials are physically separated from a light emitting surface of the first LED and a light emitting surface of the second LED.

6. The method of claim 1, wherein the modulating of the first and second currents involves any of amplitude modulation, frequency modulation, pulse width modulation, and phase modulation.

7. The method of claim 1, wherein the color of the light emitted from the LED based illumination device varies at a frequency less than 2,000 hertz.

8. The method of claim 1, wherein the color of the light emitted from the LED based illumination device varies along lines of constant Correlated Color Temperature (CCT) in a CIE 1931 color space.

9. The method of claim 1, wherein a Correlated Color Temperature (CCT) of the light emitted from the LED based illumination device varies in a CIE 1931 color space.

10. A method of receiving information from an LED based illumination device, comprising:
    receiving an amount of light emitted from the LED based illumination device, wherein a luminous flux of the amount of light emitted from the LED based illumination device remains approximately constant while a color of light varies, wherein the color of light varies by modulating a first current provided to a first LED in the LED based illumination device, and modulating a second current provided to a second LED in the LED based illumination device; wherein the first LED preferentially illuminates a first wavelength converting material, and wherein the second LED preferentially illuminates a second wavelength converting material that is different from the first wavelength converting material;

determining a signal indicative of the color of the received light; and demodulating the signal indicative of the color of the received light to determine the digital data received from the LED based illumination device.

11. The method of claim 10, wherein the receiving of the amount of light emitted from the LED based illumination device involves a color sensing device.

12. The method of claim 11, wherein the color sensing device is any of a Complementary Metal-Oxide Semiconductor (CMOS) device, a Charge-Coupled Device (CCD) device, and a filtered photodiode.

13. The method of claim 10, wherein the demodulating the signal indicative of the color of the received light involves any of amplitude demodulation, frequency demodulation, pulse width demodulation, and phase demodulation.

14. The method of claim 10, wherein the color of the light received from the LED based illumination device varies at a frequency less than 2,000 hertz.

15. The method of claim 10, wherein the color of the light received from the LED based illumination device varies along lines of constant Correlated Color Temperature (CCT) in a CIE 1931 color space.

16. The method of claim 10, wherein a Correlated Color Temperature (CCT) of the light received from the LED based illumination device varies in a CIE 1931 color space.

17. An LED based illumination device comprising:

a first LED configured to receive a first current, wherein light emitted from the first LED enters a color conversion cavity, and wherein a first light emitted from the LED based illumination device based on the light emitted from the first LED is a first colored light;

a second LED configured to receive a second current, wherein light emitted from the second LED enters the color conversion cavity, and wherein a second light emitted from the LED based illumination device based on the light emitted from the second LED is a second colored light; and a modulator configured to receive an amount of digital data and modulate the first current and the second current such that a luminous flux of the light emitted from the LED based illumination device remains approximately constant and a combined color of light emitted from the LED based illumination device varies based on the digital data; wherein the light emitted from the first LED preferentially illuminates a first wavelength converting material that is physically separated from a light emitting surface of the first LED, and wherein the light emitted from the second LED preferentially illuminates a second wavelength converting material that is physically separated from a light emitting surface of the second LED.

18. The LED based illumination device of claim 17, wherein the modulating of the first and second currents involves any of amplitude modulation, frequency modulation, pulse width modulation, and phase modulation.

19. The LED based illumination device of claim 17, wherein the color of the light emitted from the LED based illumination device varies at a frequency less than 2,000 hertz.

20. The LED based illumination device of claim 17, wherein the color of the light emitted from the LED based illumination device varies along lines of constant Correlated Color Temperature (CCT) in a CIE 1931 color space.

21. The LED based illumination device of claim 17, wherein a Correlated Color Temperature (CCT) of the light emitted from the LED based illumination device varies in a CIE 1931 color space.

22. The LED based illumination device of claim 17, wherein a color point of the light emitted from the LED based illumination device varies within a degree of departure $\Delta xy$ of 0.010 from a nominal color point in a CIE 1931 xy diagram.

* * * * *